US008577826B2

(12) United States Patent
Berard et al.

(10) Patent No.: US 8,577,826 B2
(45) Date of Patent: Nov. 5, 2013

(54) AUTOMATED DOCUMENT SEPARATION

(75) Inventors: Jean-Jacques Berard, Villeurbanne (FR); Stephane Lichtenberger, Tupin et Semons (FR)

(73) Assignee: Esker, Inc., Madison, WI (US)

( * ) Notice: Subject to any disclaimer, the term of this patent is extended or adjusted under 35 U.S.C. 154(b) by 530 days.

(21) Appl. No.: 12/835,773

(22) Filed: Jul. 14, 2010

(65) Prior Publication Data

US 2012/0016832 A1    Jan. 19, 2012

(51) Int. Cl.
G06F 17/00    (2006.01)
G06N 5/02    (2006.01)

(52) U.S. Cl.
USPC ............................................ 706/47

(58) Field of Classification Search
USPC .................................... 706/47, 46, 45, 62
See application file for complete search history.

(56) References Cited

U.S. PATENT DOCUMENTS

| | | | |
|---|---|---|---|
| 6,907,431 B2 | 6/2005 | Lin | |
| 7,069,501 B2 | 6/2006 | Kunitake et al. | |
| 7,251,644 B2 | 7/2007 | Viola et al. | |
| 7,493,323 B2 | 2/2009 | Kojima | |
| 2005/0134935 A1 | 6/2005 | Schmidtler et al. | |

OTHER PUBLICATIONS

Culotta et al, "Corrective Feedback and Persistent Learning for Information Extraction", Published in: Artificial Intelligence Journal, vol. 170, Issue 14-15, pp. 1101-1122, Oct. 2006.*

Sidorova et al, "Knowledge-Based Approach to Document Analysis", International Journal "Information Technologies and Knowledge" vol. 2 / 2008.*
Clark et al, "A Classifier System for Author Recognition Using Synonym-Based Features", A. Gelbukh and A.F. Kuri Morales (Eds.): MICAI 2007, LNAI 4827, pp. 839-849, 2007, Springer-Verlag Berlin Heidelberg 2007.*
Estival et al, "Author Profiling for English Emails", In10th Conference of the Pacific Association for Computational linguistics (PACLING 2007) (2007), pp. 262-272, 2007.*
Culotta et al, "Extracting social networks and contact information from email and the Web", In: Proc. Conference on Email and Anti-Seam CEAS Mountain View, USA (Jul. 2004).*
Lampert et al, "Segmenting Email Message Text into Zones", Proceedings of the 2009 Conference on Empirical Methods in Natural Language Processing, pp. 919-928, Singapore, Aug. 6-7, 2009, 2009 ACL and AFNLP.*

(Continued)

Primary Examiner — Jeffrey A Gaffin
Assistant Examiner — Ilya Traktovenko
(74) Attorney, Agent, or Firm — Michael Best & Friedrich LLP

(57) ABSTRACT

Systems and methods for automated document separation. The system includes a host device that is configured to communicate with one or more client devices over a network. The host device includes a splitting module, a correction module, a knowledge base, and a document store. The splitting module is configured to perform a multi-level document splitting. Pages are grouped into documents based on the sender information, the lack of sender information, and whether the sender is known. The splitting module performs an automatic correction of the initial document separation based on information stored within the knowledge base. The knowledge base is updated each time a document is processed and a user provides feedback related to whether the documents were successfully separated. Based on the success or failure of a particular document separation, the knowledge base evaluates the modifications made by a user to learn from the errors made during document separation.

20 Claims, 31 Drawing Sheets

(56) References Cited

OTHER PUBLICATIONS

Tiedemann et al, "Simple is Best: Experiments with Different Document Segmentation Strategies for Passage Retrieval", Coling 2008: Proceedings of the 2nd workshop on Information Retrieval for Question Answering (IR4QA), pp. 17-25 Manchester, UK. Aug. 2008.*

Brants et al, "Topic-Based Document Segmentation with Probabilistic Latent Semantic Analysis", CIKM'02, Nov. 4-9, 2002, McLean, Virginia, USA, 2002 ACM.*

Sun et al, "Topic Segmentation with Shared Topic Detection and Alignment of Multiple Documents", SIGIR 2007 Proceedings, SIGIR'07, Jul. 23-27, 2007, Amsterdam, The Netherlands, 2007 ACM.*

Collins-Thompson, Kevyn, et al., "A Clustering-Based Algorithm for Automatic Document Separation", 2002.

Kofax, Classification and Separation, White Paper, available online at: <http://www.advancedcapture.com/learning_center/pdfs/White%20Paper-%20High_Volume_Document_Classification_and_Separation.pdf>, Mar. 2008.

SpringerLink, "Automatic Document Separation: A Combination of Probabilistic Classification and Finite-State Sequence Modeling", Natural Language Processing and Text Mining, Free Preview, available online at: <http://www.springerlink.com/content/r77173565j608154>, 2007.

EMC, Documentum Family—Including Documentum Applications and Clients, Documentum Developer Components, Documentum Enterprise-Class Infrastructure, Documentum Platform Architecture, and Documentum Platform Extensions, available online at: <http://www.emc.com/products/family/documentum-family.htm>, available at least as early as May 17, 2010.

Hyland Software Solution, Imaging and Capture Modules, Document Capture—Document Imaging Solutions by Hyland Software, available at least as early as Feb. 26, 2010.

Captaris, DOKuStar Validation, printed in Germany, Feb. 2008.

ITESOFT, Automated Invoice Processing and ERP Integration, available online at: <http://www.itesoft.com/?sol-invoice-processing-capture-software>, available at least as early as Feb. 25, 2010.

ITESOFT, Automated Mail Processing and Document Capture Solution, available online at: <http://www.itesoft.com/?sol-mailroom-document-capture>, available at least as early as Feb. 25, 2010.

CaptureNow, perceptivesoftware, copyright 2008.

OpenText—The Content Experts, Open Text Capture Document Reader, copyright 2009.

OpenText—The Content Experts, Open Text Capture Document Extraction (DOKuStar), copyright 2009.

Adobe Acrobat 9 Pro, Data Sheet, printed in the USA, Apr. 2008.

EMC, EMC Captiva InputAccel Express, Data Sheet H3552.1, published in the USA, Dec. 2007.

KOFAX Capture, Release Notes for Ascent 7.0 Release Script for FileNet Panagon Content Services 5.2-5.4, 10001758-000, Jul. 3, 2008.

ReadSoft, Documents for Invoices, Invoices 5-5, Jul. 2009.

* cited by examiner

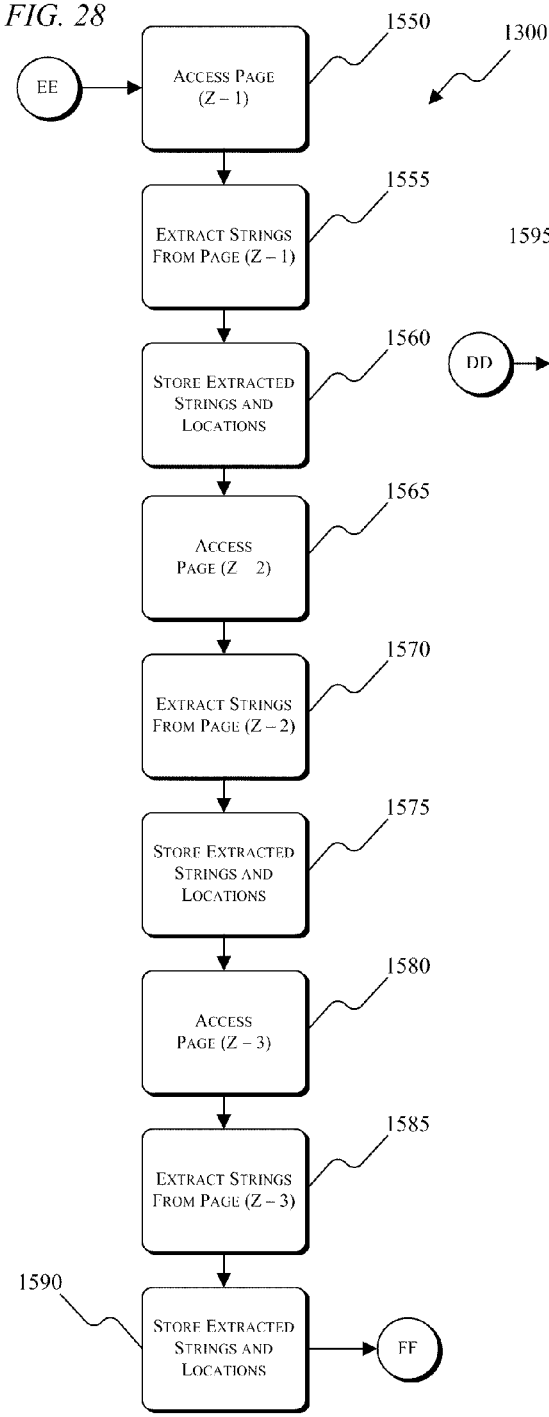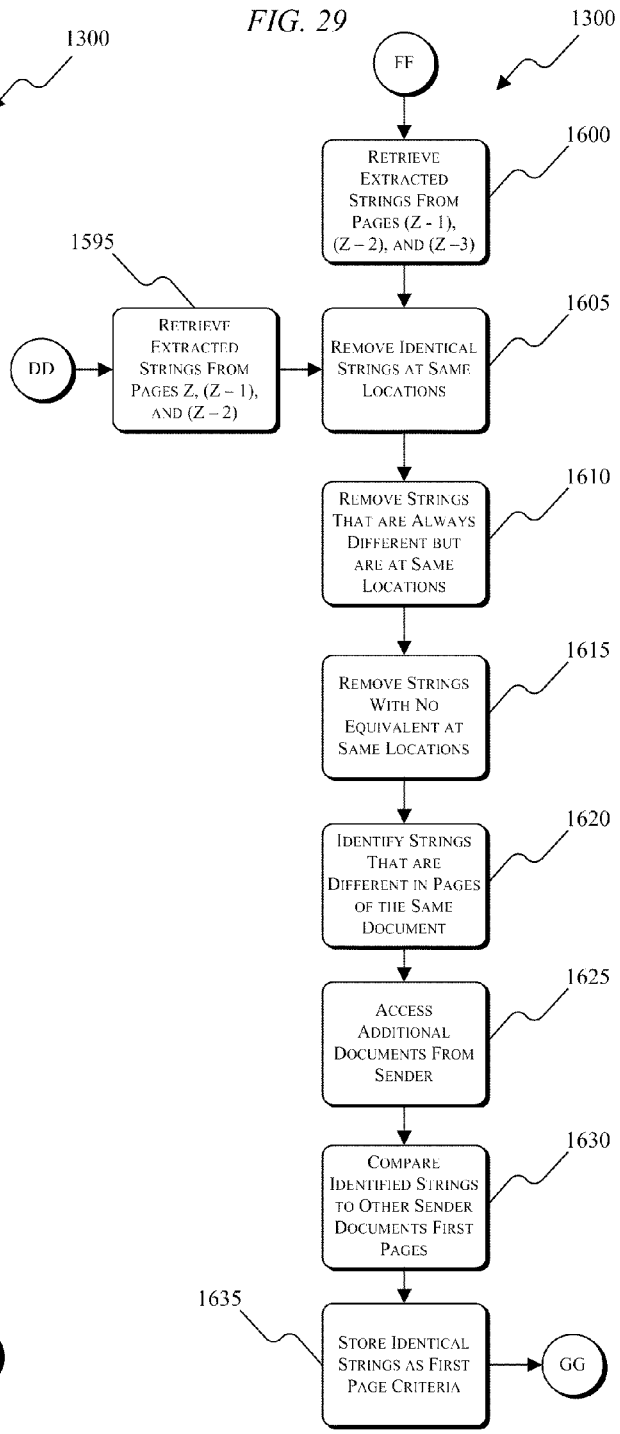

AUTOMATED DOCUMENT SEPARATION

BACKGROUND

This invention relates to electronic document separation.

Documents are often received or processed in batches, as opposed to individually. Batch processing of documents is beneficial for a variety of reasons, such as, for example, it saves a user time by not having to scan documents one at a time. Batch processing often involves the use of separator pages between individual documents. These separator pages are recognized by a scanner or processing system, and the individual documents are separated accordingly.

SUMMARY

Document splitting techniques, such as using separator pages, are inefficient because of the time required to properly insert page separators between documents. Additionally, if a page separator is incorrectly placed within a batch of documents, a user may have to rescan multiple documents to correct the error. Alternatively, manual correction programs can be employed to correct for misplaced page separators, but such programs are unable to, for example, learn from prior corrections.

This invention provides an automatic electronic document separation system that does not require the use of page separators and reduces the requirement for manual user corrections by analyzing and learning from previous manual corrections. The system includes a host device (e.g., a server) that is configured to communicate with one or more client devices over a network (e.g., the Internet). The host device includes, among other things, a controller and a memory. A plurality of modules are connected to, or included in, the controller for executing various functions of the system. For example, the plurality of modules include a splitting module, a correction module, a knowledge base, and a document store. The splitting module is configured to perform a multi-level document splitting. In one embodiment, a preliminary document splitting is performed based on extracted sender information from the pages of a compilation document. Pages are grouped into documents based on, for example, the sender information, whether the sender is known, and the lack of sender information. Following the preliminary splitting, the splitting module performs an automatic correction of the preliminary document splitting based on information stored within the knowledge base. The information within the knowledge base is stored according to, for example, sender information. The automatic correction is based on previous instances of documents from the sender. In one embodiment, a sender success counter and a sender failure counter, which are incremented based on prior successes and failures splitting documents from the sender, are used to determine whether the preliminary document splitting correctly separated the documents. The splitting module also uses flags, such as a cover page flag and a multiple document flag, to further evaluate whether the preliminary document splitting correctly separated the documents.

The knowledge base is updated each time a document is processed and a user provides feedback related to whether the documents were successfully separated. Based on the success or failure of the splitting module, the knowledge base evaluates the modifications made by a user and compares extracted strings from each page to determine what error was made during the document separation. The knowledge base is then updated to reduce the likelihood of, or prevent the occurrence of, the same error in the future.

The invention provides a method of automatically splitting electronic documents. The method includes extracting one or more data strings from a compilation document that includes one or more pages, identifying sender information for the one or more pages based on the extracted data strings, and separating the one or more pages into one or more separated documents based on the sender information. The method also includes accessing an automatic correction rule in a knowledge base, and performing an automatic correction on the one or more separated documents based on the automatic correction rule to generate one or more automatically-corrected documents. User feedback is then received related to the automatically-corrected documents, the received user feedback is analyzed, and the automatic correction rule is updated based on the analysis of the user feedback.

The invention also provides a system for automated document separation. The system includes a client device and a host device. The client device is configured to transmit a compilation document that includes one or more pages over a network. The host device includes a processor and is configured to extract one or more data strings from the compilation document, identify sender information for the one or more pages of the compilation document based on the extracted data strings, and separate the one or more pages of the compilation document into one or more separated documents based on the sender information. The host device then accesses an automatic correction rule stored within a knowledge base, and performs an automatic correction on the one or more separated documents based on the automatic correction rule to generate one or more automatically-corrected documents. The host device receives user feedback related to the automatically-corrected documents, analyzes the received user feedback, and updates the automatic correction rule based on the analysis of the user feedback.

In another embodiment, the invention provides a device for automated document separation. The device includes a memory and a processor connected to the memory. The processor is configured to extract one or more data strings from a compilation document that includes one or more pages, identify sender information for the one or more pages of the compilation document based on the extracted data strings, and separate the one or more pages of the compilation document into one or more separated documents based on the sender information. The processor then accesses an automatic correction rule stored within a knowledge base, and performs an automatic correction on the one or more separated documents based on the automatic correction rule to generate one or more automatically-corrected documents. The processor receives user feedback related to the automatically-corrected documents, analyzes the received user feedback, and updates the automatic correction rule based on the analysis of the user feedback.

Other aspects of the invention will become apparent by consideration of the detailed description and accompanying drawings.

BRIEF DESCRIPTION OF THE DRAWINGS

FIGS. 23-30 illustrate a process for analyzing user modifications to the preliminary and automatic document splitting.

DETAILED DESCRIPTION

Figure 1:
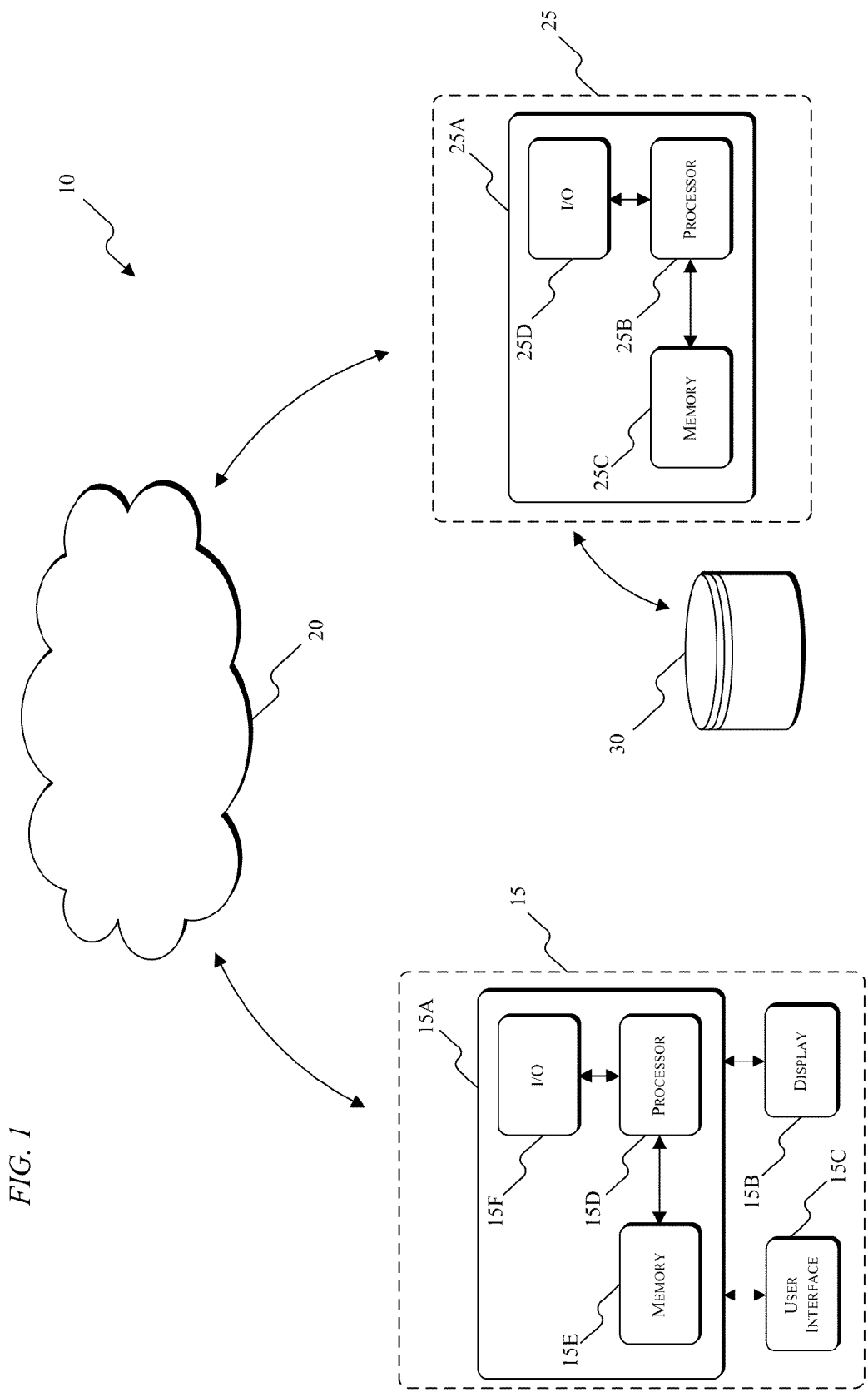
FIG. 1 illustrates a document splitting system.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

The invention described herein relates to an automatic electronic document splitting system that analyzes information within a plurality of pages, as well as user input, to learn from previous, incorrect attempts to split documents. The system includes a host device (e.g., a server) that is configured to communicate with one or more client devices over a network (e.g., the Internet). The host device includes, among other things, a controller, an input/output module, and a memory. A plurality of modules are connected to or included in the controller for executing various functions of the document splitting system. For example, the plurality of modules includes a splitting module, a correction module, a knowledge base, and a document store. The splitting module is configured to perform a multi-level document splitting. In some embodiments, a preliminary document splitting is performed based on extracted sender information from the documents. A document is generally referred to as a set of incoming pages having the same origin (e.g., the same sender) and having the same destination, and the document is a communication, such as an invoice, a sales order, an order confirmation, remittance advice, and the like. Pages are grouped into documents based on, for example, the sender information, the lack of sender information, and whether the sender is known. Following the preliminary splitting, the splitting module performs an automatic correction of the preliminary document splitting based on information stored within the knowledge base. The information within the knowledge base is stored based on, for example, sender or page information. The automatic correction is executed based on previous instances of documents from a known sender. In one embodiment, a sender success counter and a sender failure counter are incremented based on prior successes and failures separating documents from the sender. The counters are used to determine whether the preliminary document splitting correctly separated the documents. The splitting module also uses flags, such as a cover page flag, a multiple document flag, and a multi-page document flag to further evaluate whether the preliminary document splitting correctly separated the documents.

The knowledge base is updated each time a document is processed and a user provides feedback related to whether the documents were successfully separated. Based on the success or failure of a particular document separation, the knowledge base evaluates the modifications made by a user and compares extracted strings from each page to determine what, if any, errors were made during the document splitting. The knowledge base is then updated to reduce the likelihood of, or prevent the occurrence of, the same error in the future.

A system 10 for automated document separation is illustrated in FIG. 1. The system 10 includes a client device 15, a network 20, a host device 25, and a database 30. In the illustrated embodiment, the client device 15 is, for example, a personal computer or scanner. However, in other embodiments, the client device 15 is any device which is capable of accessing the network 20. Such devices include mobile phones, laptop computers, tablet computers, personal digital assistants ("PDAs"), Wi-Fi enabled media devices, e-book readers, and the like. The client device 15 includes, among other things, a controller or control module 15A, a display 15B, and a user interface 15C. The controller 15A includes a processor 15D, a memory 15E, such as a read-only memory ("ROM"), a random access memory ("RAM"), an electrically erasable programmable read-only memory ("EEPROM"), a flash memory, or the like, and an input/output ("I/O") interface 15F. The client device 15 is connectable to the host device 25 (e.g., a server) over the network 20. The host device 25 includes, among other things, a controller or control module 25A, a processor 25B, a memory 25C, such as a ROM, a RAM, an EEPROM, a flash memory, or the like, and an I/O interface 25D. The network 20 is, for example, a wide area network ("WAN") (e.g., the Internet, a GSM network, an EDGE network, a PCS network, a D-AMPS network, etc.), a local area network ("LAN") (e.g., Ethernet, etc.), or personal area network ("PAN") (e.g., Wi-Fi, Bluetooth, ZigBee, etc.). The host device 25 is connected to an external memory for storing information related to the processing and separation of documents, such as the database 30. The host device 25 is also configured to receive, process, and send documents over the network 20 via email, file transfer protocol ("FTP"), and the like. In addition to communicating over the network 20, the host device 25 is also capable of communicating using additional or different services and protocols, such as short message service ("SMS"), multimedia messaging service ("MMS"), simple mail transfer protocol ("SMTP"), and the like.

Figure 2:
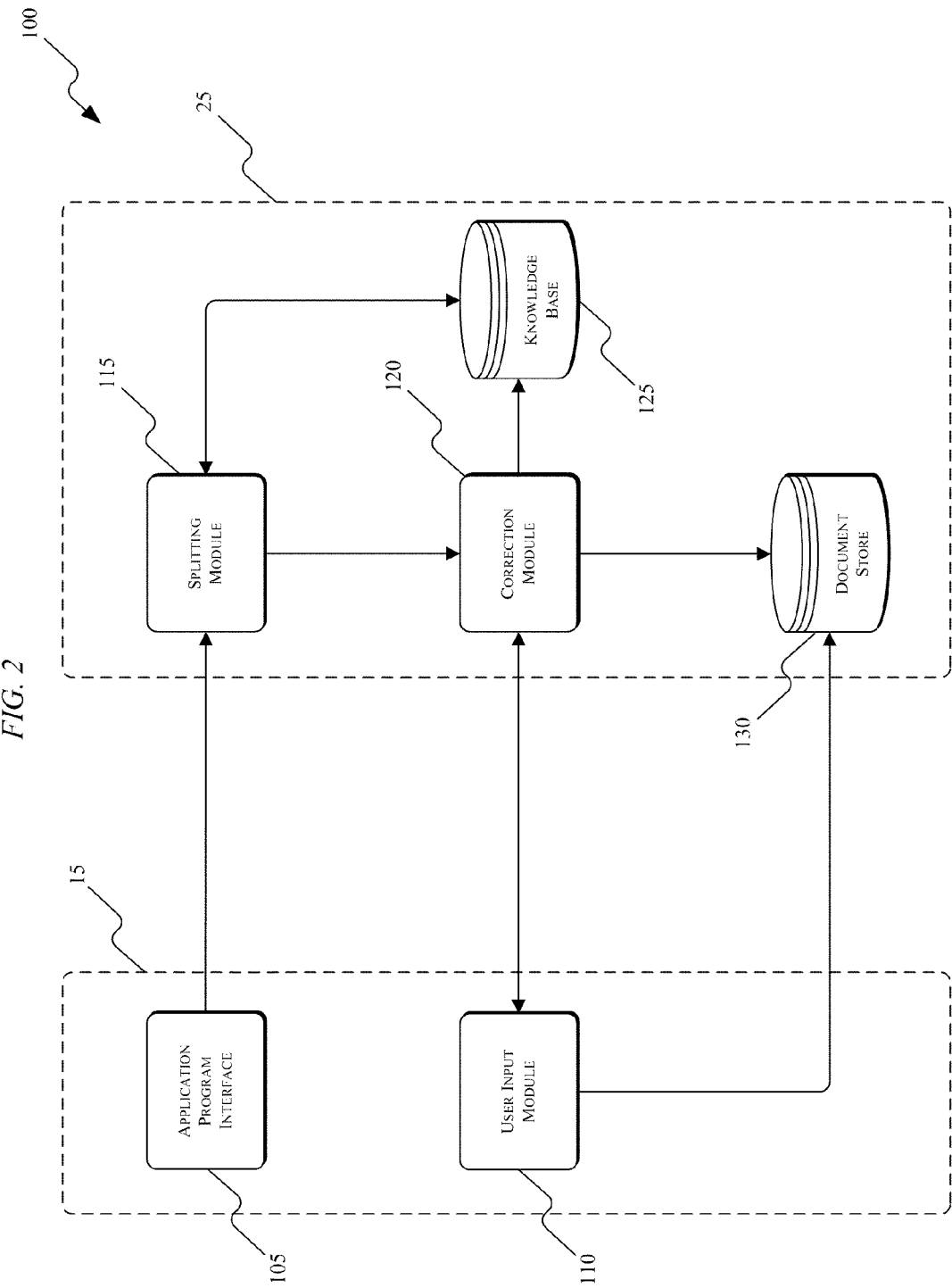
FIG. 2 illustrates a document flow process for splitting documents.

FIG. 2 illustrates a document flow process 100 for splitting documents. The process 100 is described with respect to the interactions between the client device 15 and the host device 25. For example, the client device 15 includes, among other things, an application program interface ("API") module 105 and a user input module 110. The host device 25 includes, among other things, a splitting module 115, a correction module 120, a knowledge base 125, and a document store 130. The API module 105 generally refers to an interface between software being executed by the client device 15 and software being executed by the host device 25. For example, a scanner executes software related to the control, capture, and processing of a document. The scanned document is stored locally by the scanner in, for example, an internal memory or a document management system. The scanned document is converted to a communicable electronic form by the API module 105 for transmission to and reception by the input/output module 25d of the host device 25. Additionally or alternatively, the API module 105 corresponds to another program executed by the client device 15, such as an email client.

Following the transmission of a compilation document (i.e., a document that is composed of a plurality of pages and a plurality of individual documents) through the network 20 to the host device 25, the compilation document is routed to the splitting module 115. The compilation document is transmitted through the network 20 in a format such as, for example, PDF, TIFF, JPEG, NMP, GIF, PNG, RAW, or the like. The splitting module 115 then performs a multi-level document splitting operation. For example, the splitting module 115 extracts sender information from each page of the compilation document and performs a preliminary document separation based on the sender of each page. Sender information includes, for example, a name, a phone number, a fax number, a postal address, an email address, a value added tax ("VAT") code, a system identification directory of companies ("SIREN") code, or the like. Such an operation is performed for each page in the compilation document. After the splitting module 115 has completed the preliminary separation, the splitting module 115 accesses the knowledge base 125 to apply automatic correction rules to the preliminarily-split documents. The information within the knowledge base 125 is stored in, for example, tabular form based on sender information. This allows the sender of a particular document to be identified, the auto-correction rules for the document to be accessed, and the splitting module 115 to apply the auto-correction rules to the preliminarily-split document.

Following automatic correction, the automatically-corrected documents are provided to the correction module 120. The correction module 120 provides a user with the ability to review how the documents have thus far been split and apply any necessary manual corrections to the splitting process. The user accesses the automatically-corrected documents in the correction module 120 using the user input module 110. The user input module 110 is, for example, a browser which accesses a document processing interface (described below) of the host device 25. In other embodiments, the user input module 110 is an add-on or module within a program application or an email client. Additionally or alternatively, the correction module 120 is accessed using another Internet-enabled device (i.e., a device other than the client device 15).

The manual corrections provided by the user are saved by the knowledge base 125 for later processing and analysis. For example, as is described below, the knowledge base 125 analyses the user's manual corrections to learn from the mistakes made during the preliminary document splitting and the automatic correction, and then update the automatic correction rules on a sender-by-sender basis. Following manual correction, the documents are provided to the document store 130. The user is also able to access and search the separated documents within the document store 130. In some embodiments, the document store is connected to or is part of a document management system ("DMS") or an enterprise resource planning ("ERP") system.

Figure 3:
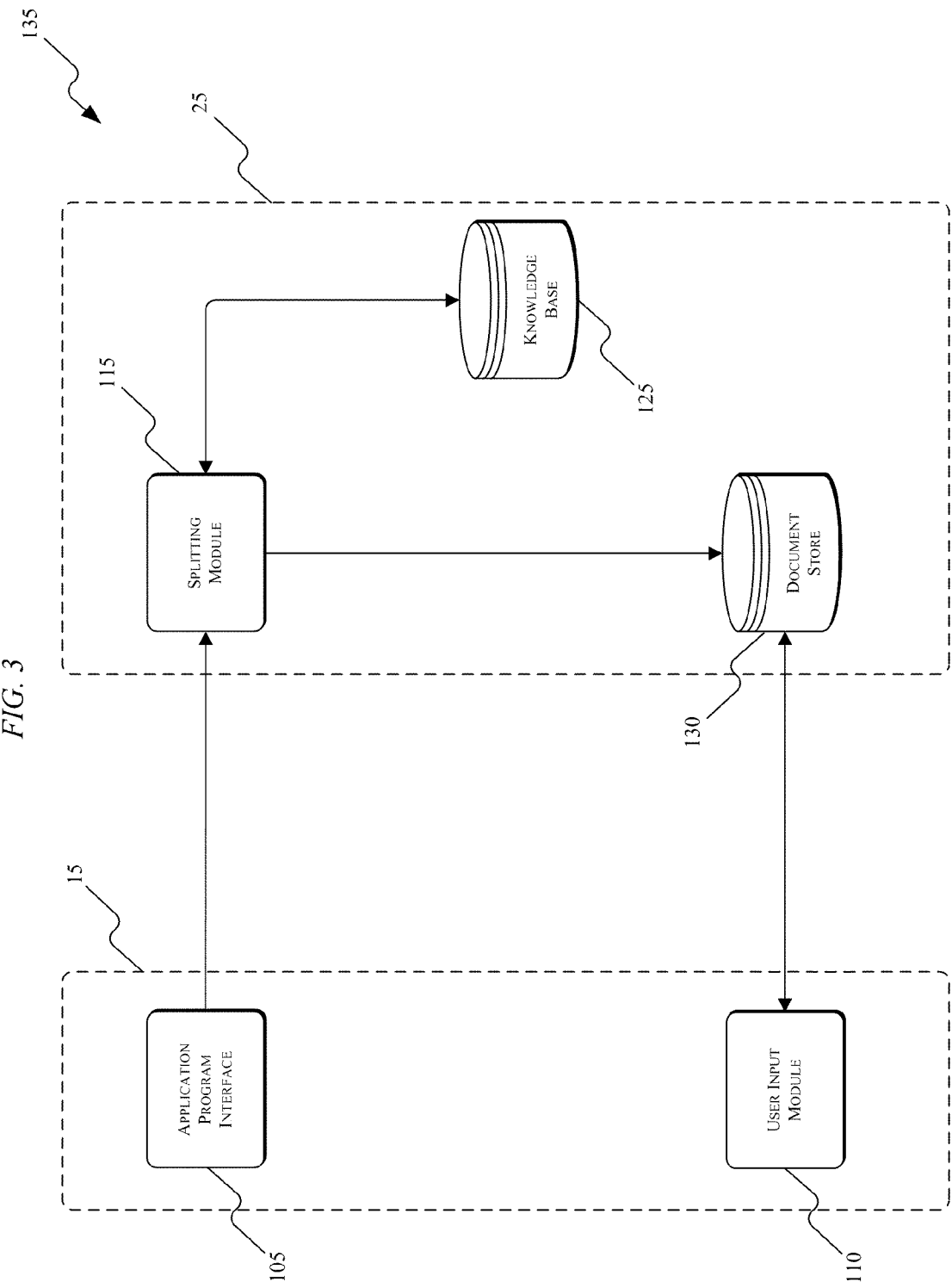
FIG. 3 illustrates an additional flow process for splitting documents.

FIG. 3 illustrates another document flow process 135 for splitting documents. The process 135 is similar to the process 100 described above with respect to FIG. 2, but is representative of an embodiment in which the knowledge base 125 has learned enough and is robust enough to no longer require manual correction of the document splitting. In some embodiments, such a process is implemented after a predetermined number of documents have been split without requiring manual correction. Additionally or alternatively, such a process is implemented on a sender-by-sender basis. For example, if documents from a particular sender have been successfully split a predetermined number of times without requiring manual correction, the documents are provided to the document store 130 without requiring input from the user.

Figure 4:
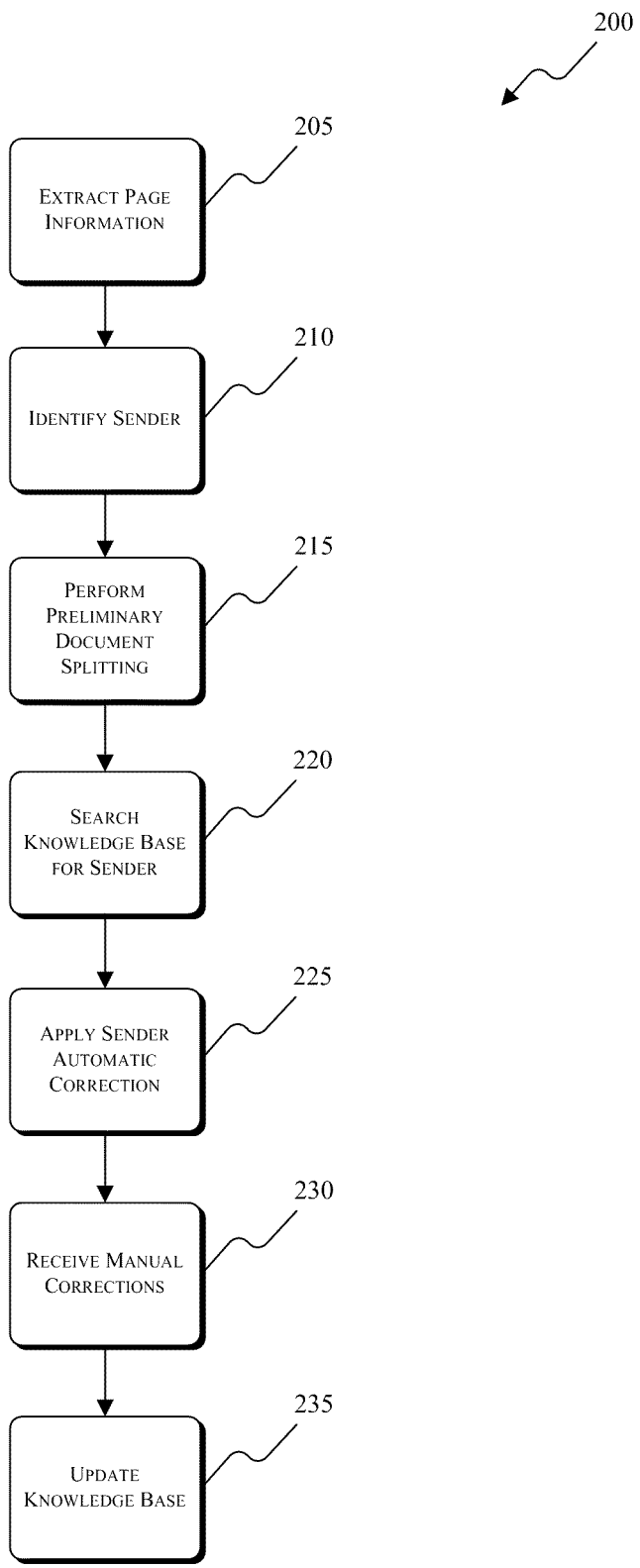
FIG. 4 illustrates further details of a flow process for splitting documents.
Figure 5:
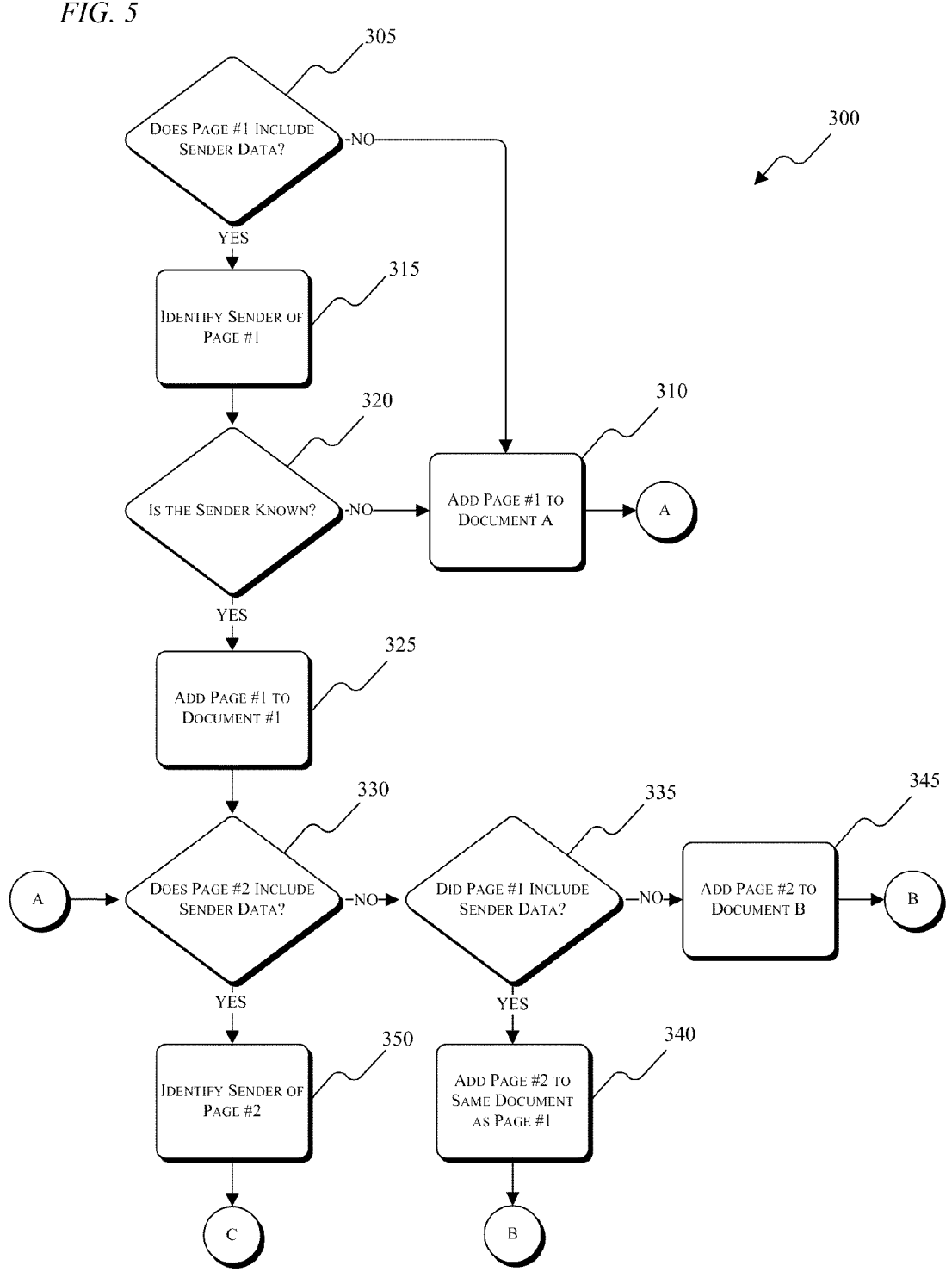
FIGS. 5-21 illustrate a process for performing a preliminary document splitting and an automatic document splitting.

FIG. 4 illustrates a process 200 executed by the host device 25 for separating documents. After the compilation document has been routed to the splitting module 115, the splitting module 115 performs the preliminary document splitting. The splitting module 115 extracts page information from each page of the compilation document (step 205). The page information includes, for example, sender information such as sender name, address, phone number, fax number, client number, etc. The page information is extracted using, for example, optical character recognition ("OCR") or another suitable technology for extracting information from the document (e.g., a non-editable document). In some embodiments, the splitting module 115 only extracts information related to the sender, as described above. Such an information extraction is implemented by extracting information from a portion of a page (e.g., a top-left quadrant), or only a predetermined number of data strings (e.g., character strings, symbol strings, numerical strings, etc.) are identified. In one embodiment, the splitting module 115 identifies strings corresponding to a ten-digit telephone number, a three-line address, or a formatted client number (e.g., a six-digit client number). Based on the extracted page information, a sender of the page is identified (step 210), and a preliminary document splitting is performed based on the sender of each page (step 215). The preliminary document splitting is described in greater detail below.

Following the initial document separation, the sender of each page, if known, is identified in the knowledge base (step 220). For example, sender information is stored in the knowledge base 125 such that the splitting module 115 is able to access the sender information using any of a plurality of search criteria (e.g., phone number, name, client number, etc.). As such, a single piece of sender information is necessary to look up the sender in the knowledge base 125. In some embodiments, to provide improved sender identification confidence, a predetermined amount of sender information is needed, such as a name and a phone number, or a phone number and a client number. In other embodiments, at least three criteria are required for identifying a sender and looking up the sender in the knowledge base 125. If an insufficient amount of sender information is available, the splitting module 115 treats the corresponding pages as not including sender information. In some embodiments, sender information is extrapolated from an incomplete set of information. For example, if an incomplete sender phone number is available and an incomplete sender name is available, partial extracted strings for both the sender phone number and the sender name are used as search criteria to search the knowledge base 125. Such a feature allows the splitting module 115 to identify the sender of a page with a high degree of certainty in the absence of a complete set of sender information.

After a known page sender has been identified in the knowledge base 125, the splitting module 115 retrieves stored automatic correction rules associated with the sender. The automatic correction rules are applied to the preliminary document splitting to refine the separation (step 225). In some embodiments, the automatic correction rules are associated with the determinations made during the preliminary document splitting, and the relative success or failure of the document splitting in the past. For example, a determination that a page is a new document or a determination that a page is a part of the same document as a previous page, are either modified or acknowledged based on information such as whether sender data was available in adjacent pages, and whether one or more flags corresponding to special document conditions (described below) are set.

Following the automatic correction of the preliminary document splitting, manual corrections from a user are received at the host device 25 (step 230). The manual corrections are provided via a user interface, and are provided to correct any mistakes made during the preliminary or automatic document splitting. An example of such a mistake is a page that corresponds to a new document being identified during the preliminary document splitting as a page within a prior document. If the automatic correction rules are unable to identify the error, the page is separated into a new document by the user's manual corrections. The manual corrections are saved by the knowledge base 125 for further analysis. The analysis by the knowledge base 125 includes an analysis of the modifications made to the separation of individual pages and an analysis of the content of the individual pages. The automatic document separation rules stored in the knowledge base 125 are then updated based on the analysis (step 235).

The process 200 for separating documents generally provided above is described in greater detail below with respect to FIGS. 5-21, which describe a process 300 for preliminarily analyzing and splitting a compilation document that includes six pages. Although the process 300 is described with respect to a compilation document that includes six pages, a compilation document that includes more or fewer pages can also be separated using the systems and processes described herein. As a person of ordinary skill in the art will appreciate, separated documents (e.g., preliminarily separated documents) are not the same as the compilation document. The separated documents are generated as a result of document splitting based on sender data. Although all of the pages within a compilation document may correspond to a single preliminarily separated document, the preliminarily separated document is generated based on the analysis of the compilation document, and is not a mere copy of the compilation document. The process 300 is described with respect to the logic and analysis required to separate the six-page compilation document without having any knowledge of the combinations of pages or individual documents within the compilation document. Following the description of the process 300 with respect to FIGS. 5-21, a specific example is provided in which the process 300 is applied to a six-page compilation document having the following page structure: (1) page 1 is a first document and includes known sender data; (2) pages 2-3 are a second document, include the same sender data, and the sender is unknown; (3) pages 4-5 are a third document, page 4 is a cover sheet, and page 5 includes known sender data; and (4) page 6 is a fourth document and has the same sender information as page 5.

The preliminary document separation process 300 executed by the splitting module 115 begins with determining whether page 1 of the compilation document includes sender data (step 305). If page 1 does not include sender data, page 1 is added to DOCUMENT A (step 310) and the process 300 proceeds to control section A and page 2 of the compilation document. If page 1 does include sender data, the sender of page 1 is identified (step 315), and the sender is compared to, for example, the knowledge base 125 to determine whether the sender is known (step 320). If the sender of page 1 is not known, page 1 is added to DOCUMENT A (step 310) and the process 300 proceeds to control section A. If the sender of page 1 is known, page 1 is added to DOCUMENT 1 (step 325) and the process 300 proceeds to page 2 of the compilation document. At step 330, the splitting module 115 determines whether page 2 of the compilation document includes sender data. If page 2 does not include sender data, the splitting module 115 determines whether page 1 included sender data (step 335). Such a determination is made in a number of ways. For example, in some embodiments, flags or data bits are set (e.g., set equal to zero or one) corresponding to whether each page of a compilation document includes sender data, which allows the splitting module 115 to quickly determine whether each analyzed page included sender data. In other embodiments, sender information is stored in a table. The pages of the compilation document that include sender data have data entered in a sender portion of the table. The pages of the compilation document that do not have sender data have a blank or empty sender portion in of the table. If page 1 of the compilation document included sender data, page 2 is added to the same document as page 1 (step 340) and the process 300 proceeds to control section B shown in and described with respect to FIG. 7. If page 1 of the compilation document did not include sender data, page 2 is added to DOCUMENT B (step 345) and the process 300 proceeds to control section B. If, at step 330, page 2 does include sender data, the sender of page 2 is identified (step 350) and the process 300 proceeds to control section C shown in and described with respect to FIG. 6.

Figure 6:
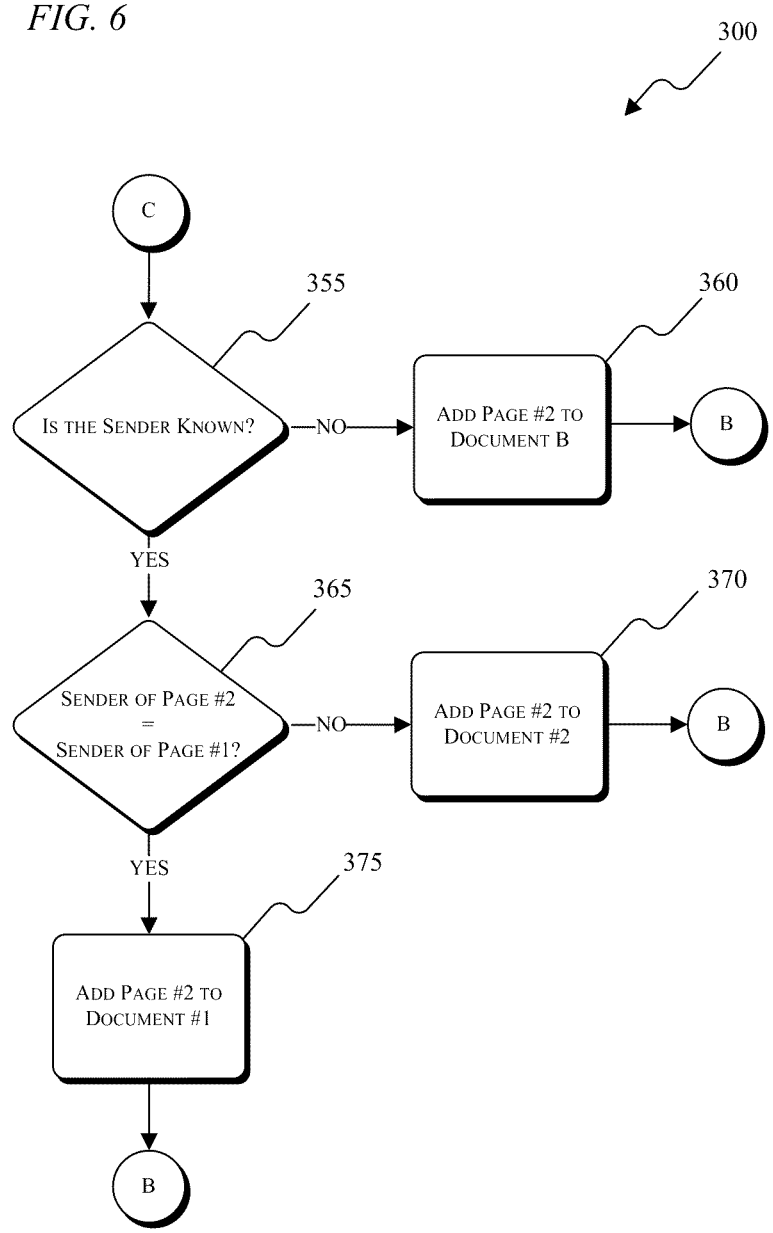

With reference to FIG. 6, the sender of page 2 is compared to the knowledge base 125 to determine whether the sender is known (step 355). If the sender of page 2 is not known, page 2 is added to DOCUMENT B (step 360) and the process 300 proceeds to control section B. If the sender of page 2 is known, the sender of page 2 is compared to the sender of page 1 (step 360). If the sender of page 2 is not the same as the sender of page 1, page 2 is added to DOCUMENT 2 (step 370) and the process 300 proceeds to control section B. If the sender of page 2 is the same as the sender of page 1, page 2 is added to DOCUMENT 1 (step 375) and the process 300 proceeds to control section B and page 3 of the compilation document.

Figure 7:
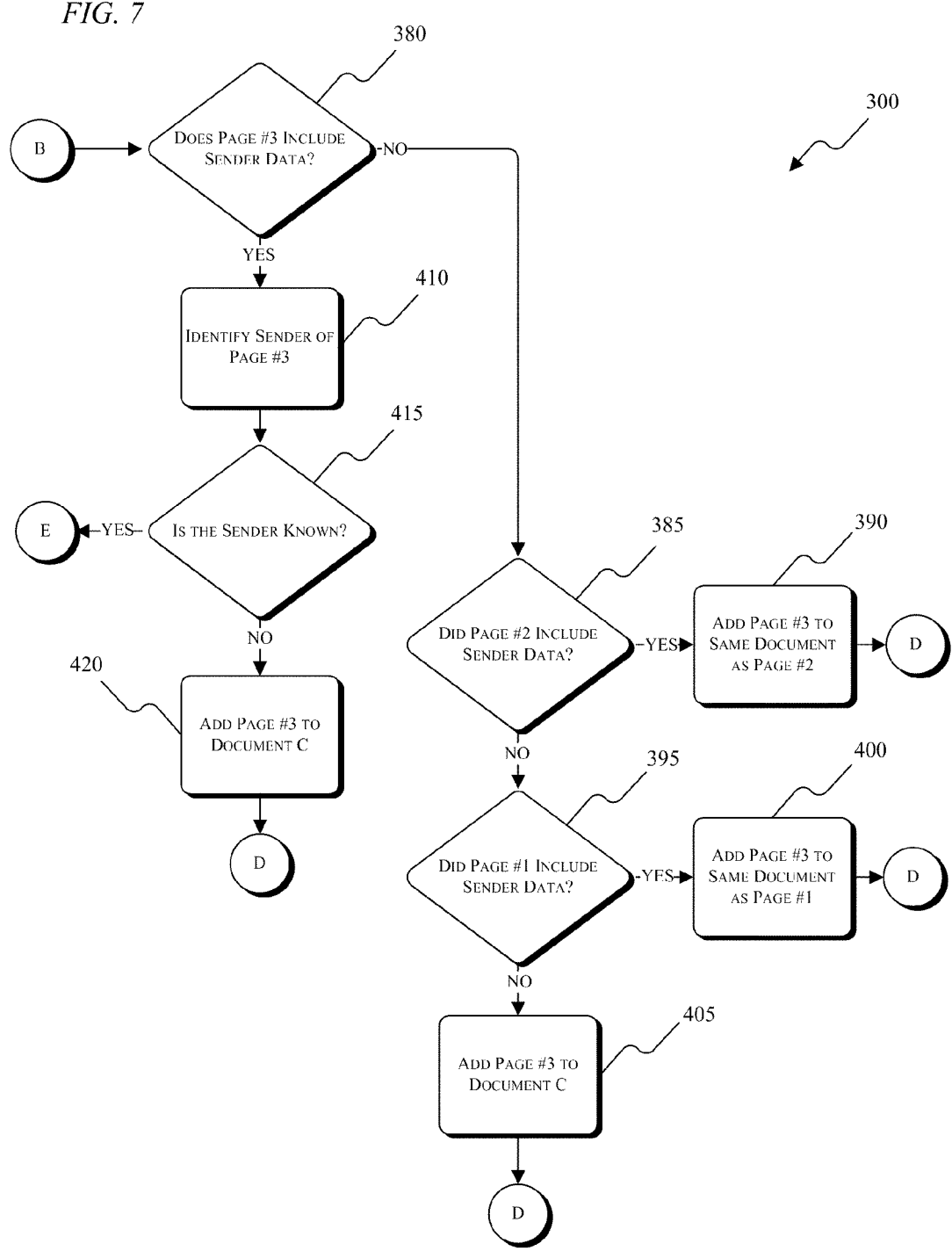

At step 380 of FIG. 7, the splitting module 115 determines whether page 3 of the compilation document includes sender data. If page 3 does not include sender data, the splitting module 115 determines whether page 2 included sender data (step 385). If page 2 of the compilation document included sender data, page 3 is added to the same document as page 2 (step 390) and the process 300 proceeds to control section D shown in and described with respect to FIG. 9. If page 2 of the compilation document did not include sender data, the splitting module 115 determines whether page 1 included sender data (step 395). If page 1 included sender data, page 3 of the compilation document is added to the same document as page 1 (step 400) and the process 300 proceeds to control section D. If page 1 did not include sender data, page 3 is added to DOCUMENT C (step 405) and the process 300 proceeds to control section D. If, at step 380, page 3 includes sender data, the sender of page 3 is identified (step 410). The sender of page 3 is then compared to the knowledge base 125 to determine whether the sender is known (step 415). If the sender of page 3 is not known, page 3 is added to DOCUMENT C (step 420) and the process 300 proceeds to control section D. If the sender of page 3 is known, the process 300 proceeds to control section E shown in and described with respect to FIG. 8.

Figure 8:
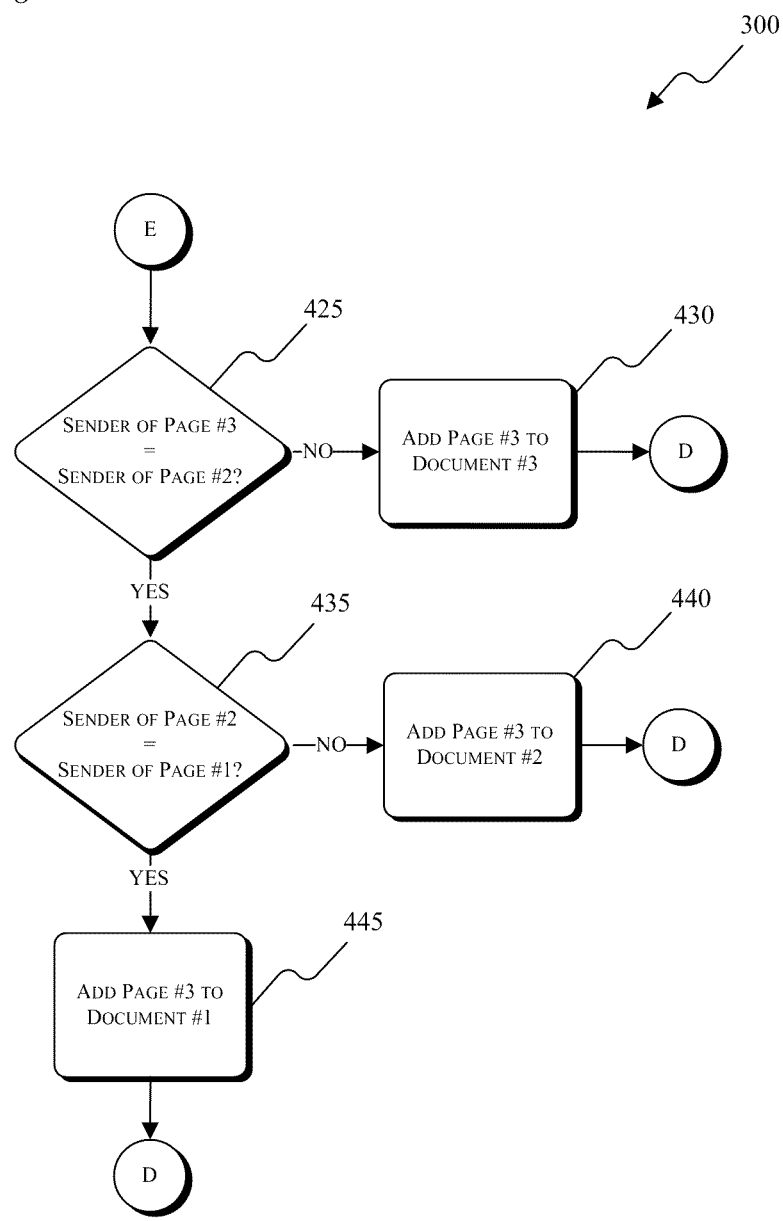

At step 425 of FIG. 8, the sender of page 3 is compared to the sender of page 2. If the sender of page 3 is the not the same as the sender of page 2, page 3 is added to DOCUMENT 3 (step 430) and the process 300 proceeds to control section D. If the sender of page 3 is the same as the sender of page 2, the sender of page 2 is compared to the sender of page 1 (step 435). If the sender of page 2 is not the same as the sender of page 1, page 3 is added to DOCUMENT 2 (step 440) and the process 300 proceeds to control section B. If the sender of page 2 is the same as the sender of page 1, page 3 is added to DOCUMENT 1 (step 445) and the process 300 proceeds to control section B and page 4 of the compilation document.

Figure 9:
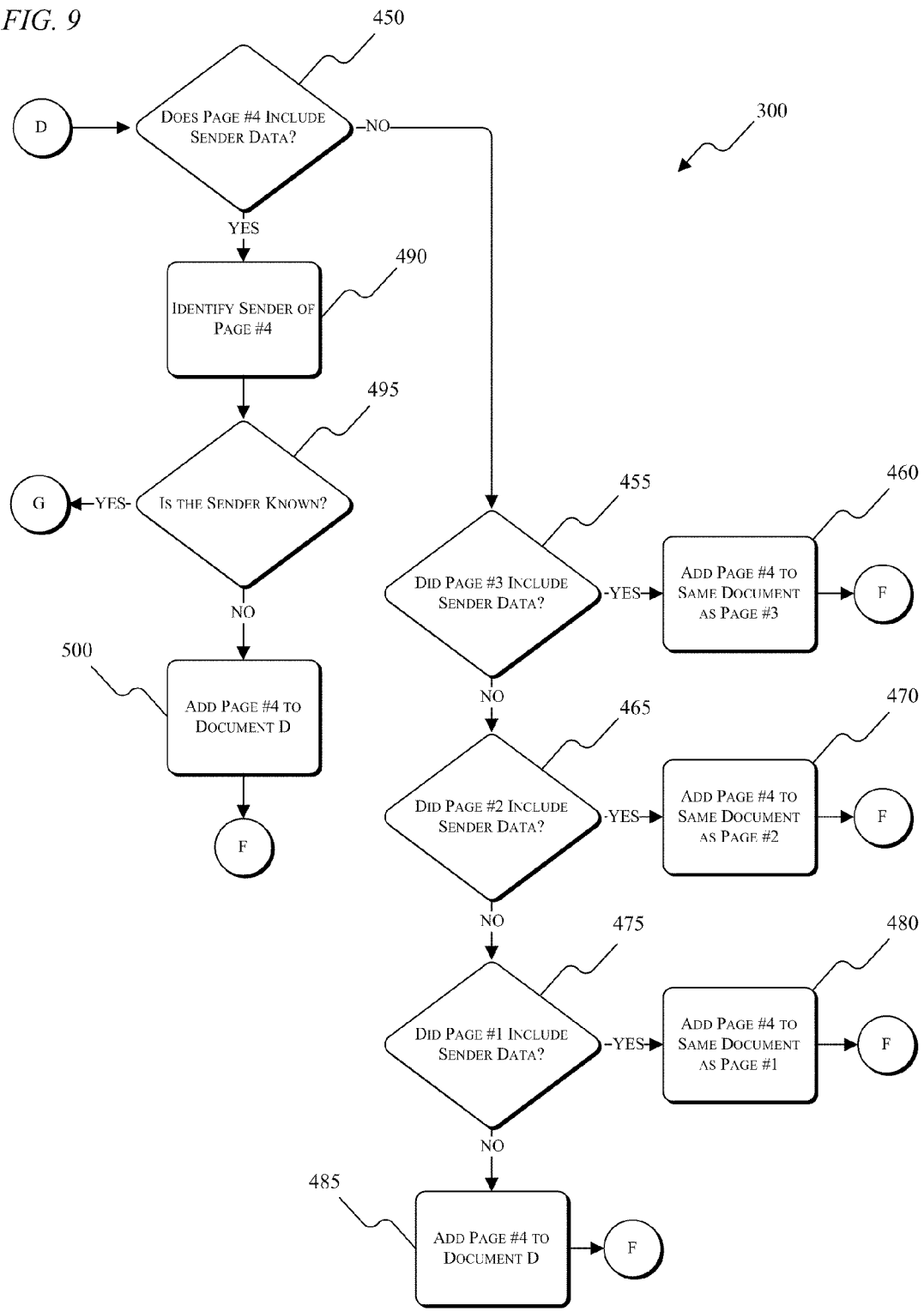

With reference to FIG. 9, the splitting module 115 determines whether page 4 of the compilation document includes sender data (step 450). If page 4 does not include sender data, the splitting module 115 determines whether page 3 included sender data (step 455). If page 3 of the compilation document included sender data, page 4 is added to the same document as page 3 (step 460) and the process 300 proceeds to control section F shown in and described with respect to FIG. 11. If page 3 of the compilation document did not include sender data, the splitting module 115 determines whether page 2 included sender data (step 465). If page 2 of the compilation document included sender data, page 4 is added to the same document as page 2 (step 470) and the process 300 proceeds to control section F. If page 2 of the compilation document did not include sender data, the splitting module 115 determines whether page 1 included sender data (step 475). If page 1 included sender data, page 4 of the compilation document is added to the same document as page 1 (step 480) and the process 300 proceeds to control section F. If page 1 did not include sender data, page 4 is added to DOCUMENT D (step 485) and the process 300 proceeds to control section F. If, at step 450, page 4 included sender data, the sender of page 4 is identified (step 490). The sender of page 4 is then compared to the knowledge base 125 to determine whether the sender is known (step 495). If the sender of page 4 is not known, page 4 is added to DOCUMENT D (step 500) and the process 300 proceeds to control section F. If the sender of page 4 is known, the process 300 proceeds to control section G shown in and described with respect to FIG. 10.

Figure 10:
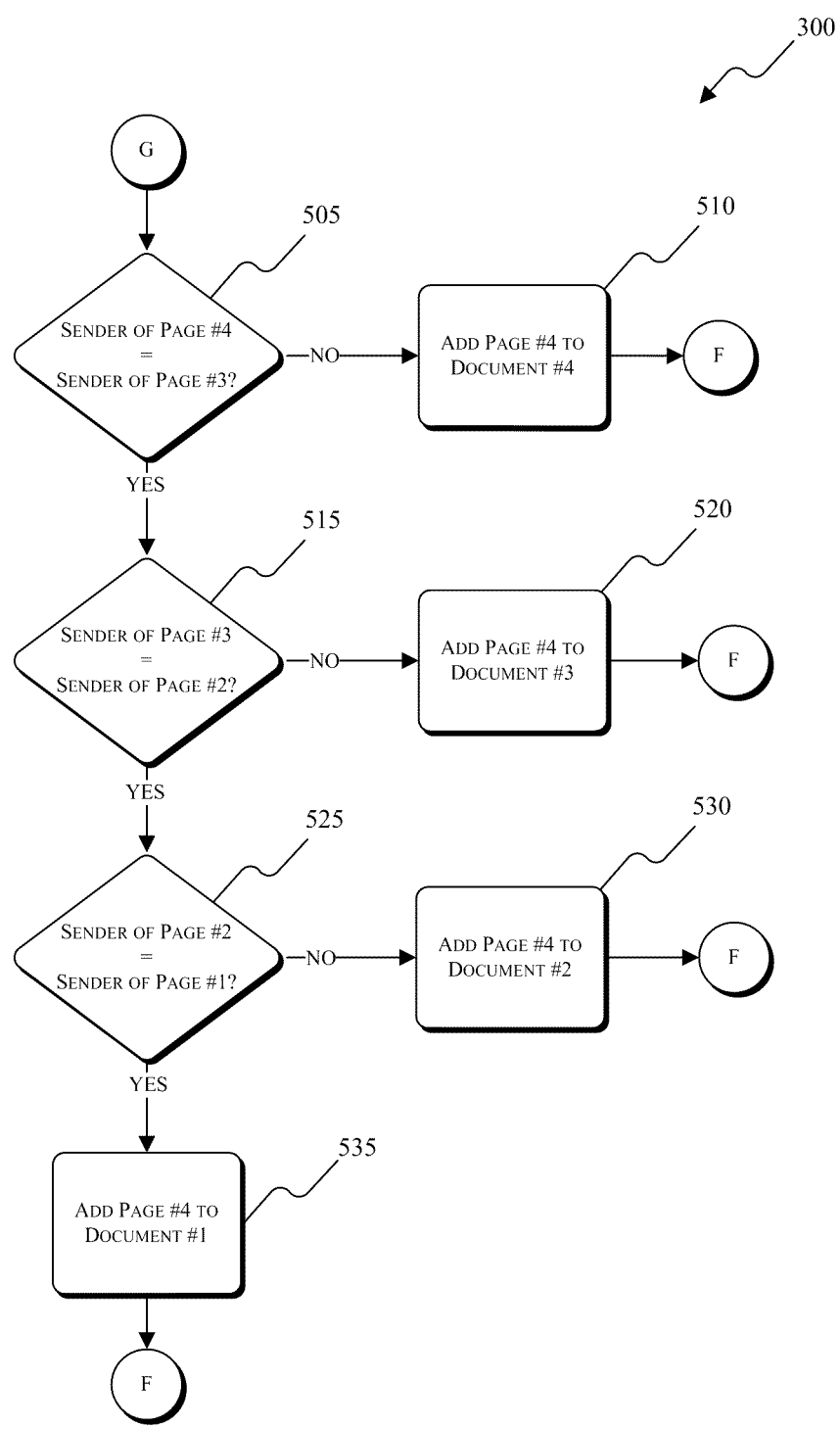

At step 505 of FIG. 10, the sender of page 4 is compared to the sender of page 3. If the sender of page 4 is the not the same as the sender of page 3, page 4 is added to DOCUMENT 4 (step 510) and the process 300 proceeds to control section F. If the sender of page 4 is the same as the sender of page 3, the sender of page 3 is compared to the sender of page 2 (step 515). If the sender of page 3 is the not the same as the sender of page 2, page 4 is added to DOCUMENT 3 (step 520) and the process 300 proceeds to control section F. If the sender of page 3 is the same as the sender of page 2, the sender of page 2 is compared to the sender of page 1 (step 525). If the sender of page 2 is not the same as the sender of page 1, page 4 is added to DOCUMENT 2 (step 530) and the process 300 proceeds to control section F. If the sender of page 2 is the same as the sender of page 1, page 4 is added to DOCUMENT 1 (step 535) and the process 300 proceeds to control section F and page 5 of the compilation document.

Figure 11:
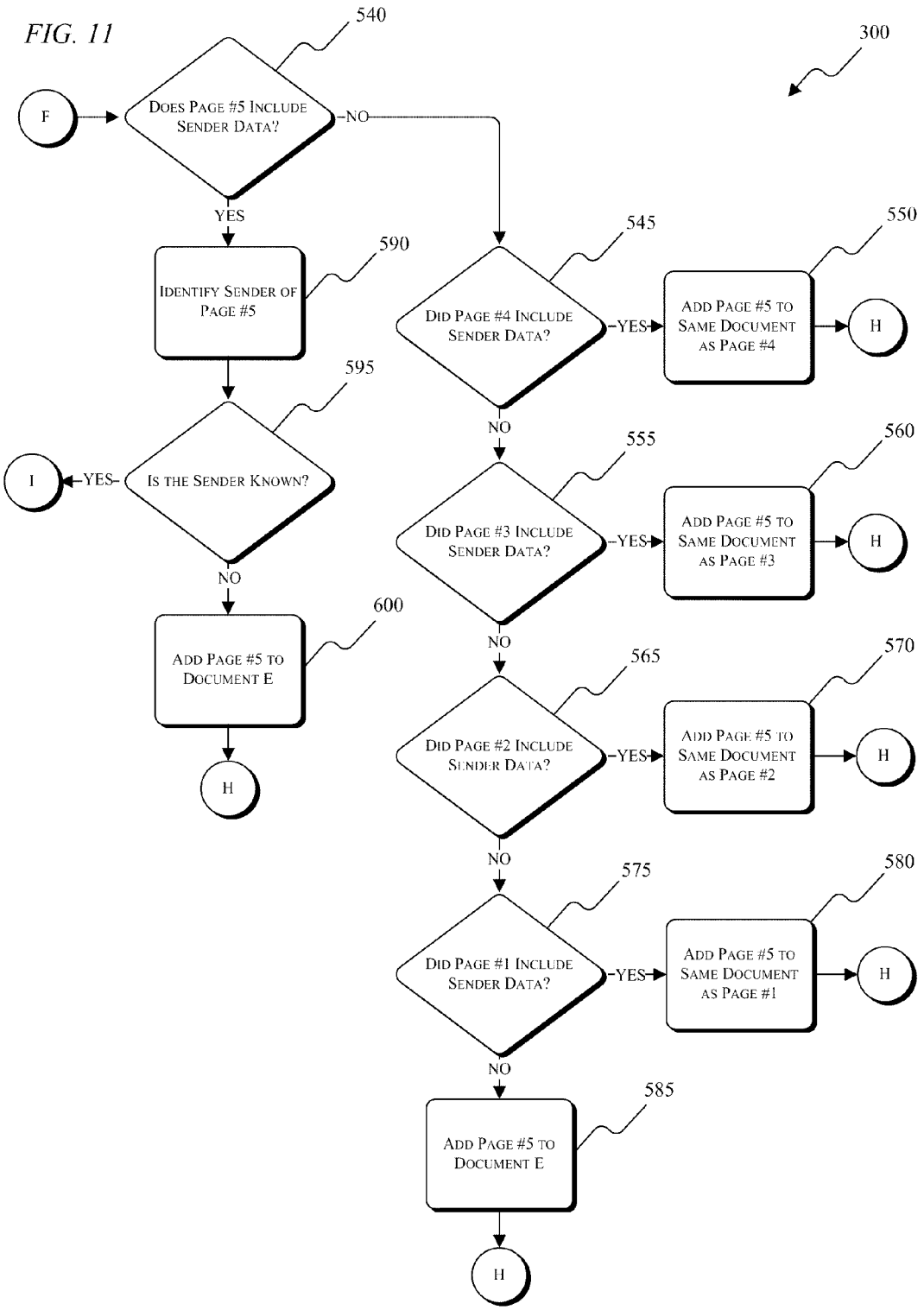

With reference to FIG. 11, the splitting module 115 determines whether page 5 of the compilation document includes sender data (step 540). If page 5 does not include sender data, the splitting module 115 determines whether page 4 included sender data (step 545). If page 4 of the compilation document included sender data, page 5 is added to the same document as page 4 (step 550) and the process 300 proceeds to control section H shown in and described with respect to FIG. 13. If page 4 of the compilation document did not include sender data, the splitting module 115 determines whether page 3 included sender data (step 555). If page 3 of the compilation document included sender data, page 5 is added to the same document as page 3 (step 560) and the process 300 proceeds to control section H. If page 3 of the compilation document did not include sender data, the splitting module 115 determines whether page 2 included sender data (step 565). If page 2 of the compilation document included sender data, page 5 is added to the same document as page 2 (step 570) and the process 300 proceeds to control section H. If page 2 of the compilation document did not include sender data, the splitting module 115 determines whether page 1 included sender data (step 575). If page 1 included sender data, page 5 of the compilation document is added to the same document as page 1 (step 580) and the process 300 proceeds to control section H. If page 1 did not include sender data, page 5 is added to DOCUMENT E (step 585) and the process 300 proceeds to control section H. If, at step 540, page 5 included sender data, the sender of page 5 is identified (step 590). The sender of page 5 is then compared to the knowledge base 125 to determine whether the sender is known (step 595). If the sender of page 5 is not known, page 5 is added to DOCUMENT E (step 600) and the process 300 proceeds to control section H. If the sender of page 5 is known, the process 300 proceeds to control section I shown in and described with respect to FIG. 12.

Figure 12:
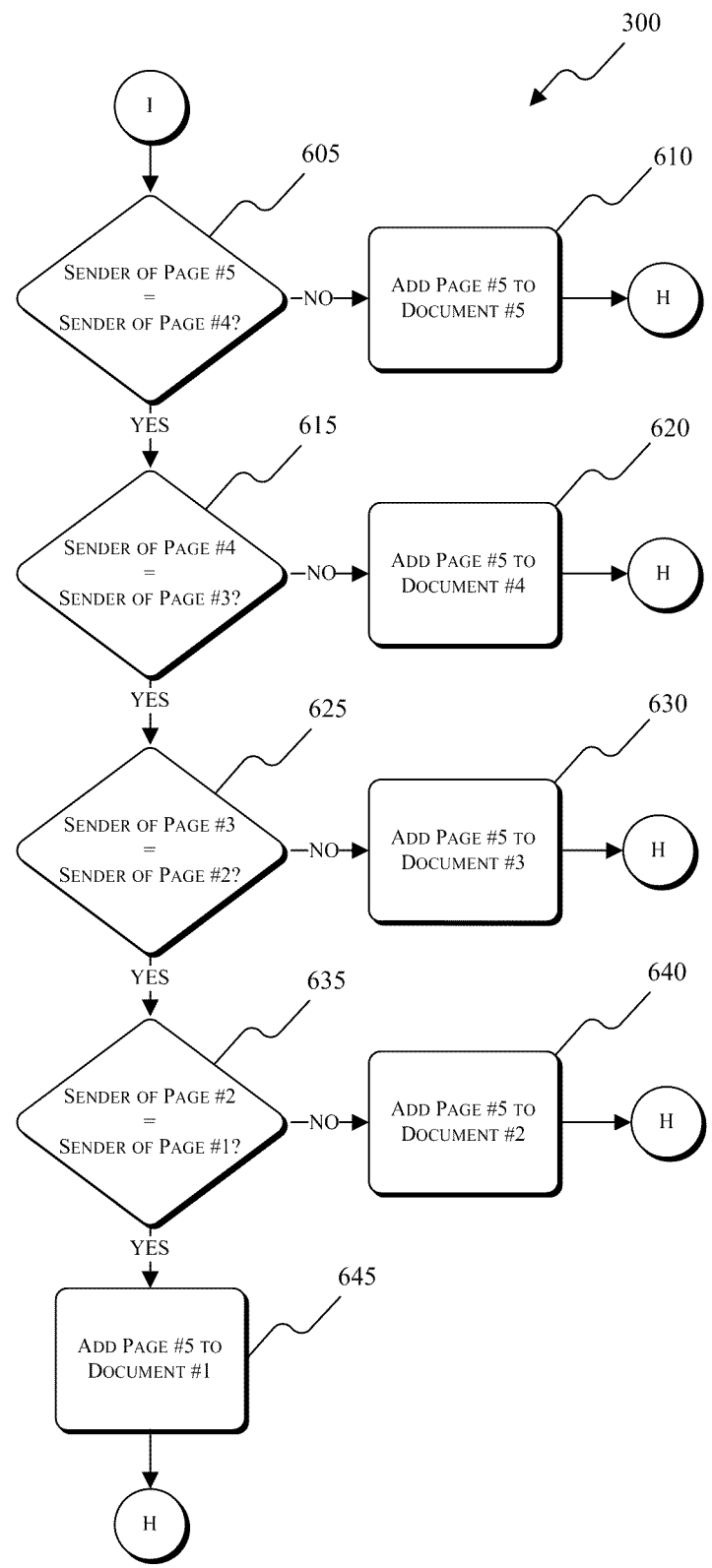

At step 605 of FIG. 12, the sender of page 5 is compared to the sender of page 4. If the sender of page 5 is the not the same as the sender of page 4, page 5 is added to DOCUMENT 5 (step 610) and the process 300 proceeds to control section H. If the sender of page 5 is the same as the sender of page 4, the sender of page 4 is compared to the sender of page 3 (step 615). If the sender of page 4 is the not the same as the sender of page 3, page 5 is added to DOCUMENT 4 (step 620) and the process 300 proceeds to control section H. If the sender of page 4 is the same as the sender of page 3, the sender of page 3 is compared to the sender of page 2 (step 625). If the sender of page 3 is the not the same as the sender of page 2, page 5 is added to DOCUMENT 3 (step 630) and the process 300 proceeds to control section H. If the sender of page 3 is the same as the sender of page 2, the sender of page 2 is compared to the sender of page 1 (step 635). If the sender of page 2 is not the same as the sender of page 1, page 5 is added to DOCUMENT 2 (step 640) and the process 300 proceeds to control section H. If the sender of page 2 is the same as the sender of page 1, page 5 is added to DOCUMENT 1 and the process 300 proceeds to control section H and page 6 of the compilation document.

Figure 13:
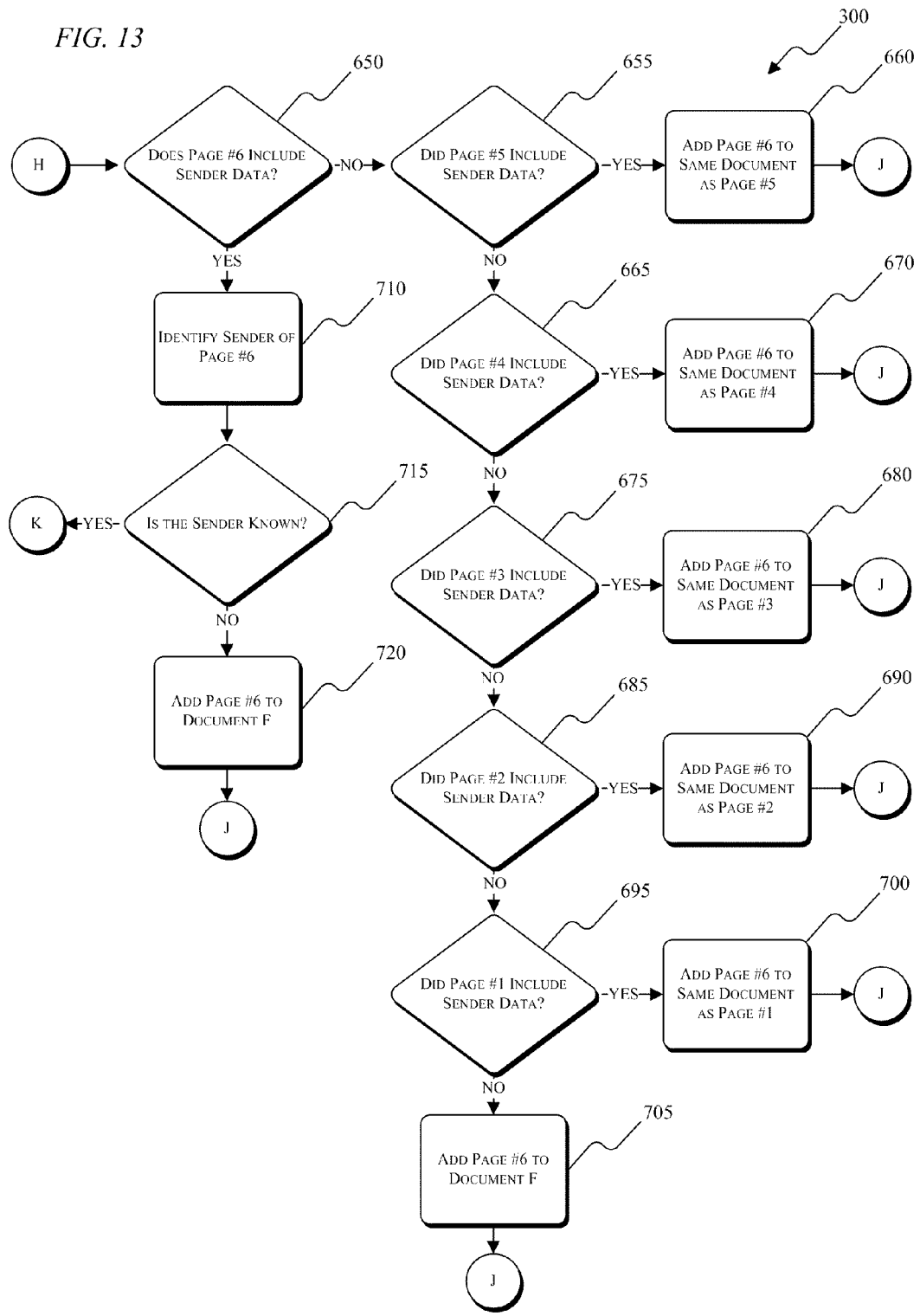

With reference to FIG. 13, the splitting module 115 determines whether page 6 of the compilation document includes sender data (step 650). If page 6 does not include sender data, the splitting module 115 determines whether page 5 included sender data (step 655). If page 5 of the compilation document included sender data, page 6 is added to the same document as page 5 (step 660) and the process 300 proceeds to control section J shown in and described with respect to FIG. 15. If page 5 of the compilation document did not include sender data, the splitting module 115 determines whether page 4 included sender data (step 665). If page 4 of the compilation document included sender data, page 6 is added to the same document as page 4 (step 670) and the process 300 proceeds to control section J. If page 4 of the compilation document did not include sender data, the splitting module determines whether page 3 included sender data (step 675). If page 3 of the compilation document included sender data, page 6 is added to the same document as page 3 (step 680) and the process 300 proceeds to control section J. If page 3 of the compilation document did not include sender data, the splitting module determines whether page 2 included sender data (step 685). If page 2 of the compilation document included sender data, page 6 is added to the same document as page 2 (step 690) and the process 300 proceeds to control section J. If page 2 of the compilation document did not include sender data, the splitting module 115 determines whether page 1 included sender data (step 695). If page 1 included sender data, page 6 of the compilation document is added to the same document as page 1 (step 700) and the process 300 proceeds to control section J. If page 1 did not include sender data, page 6 is added to DOCUMENT F (step 705) and the process 300 proceeds to control section J. If, at step 650, page 6 included sender data, the sender of page 6 is identified (step 710). The sender of page 6 is compared to the knowledge base 125 to determine whether the sender is known (step 715). If the sender of page 6 is not known, page 6 is added to DOCUMENT F and the process 300 proceeds to control section J. If the sender of page 6 is known, the process 300 proceeds to control section K shown in and described with respect to FIG. 14.

Figure 14:
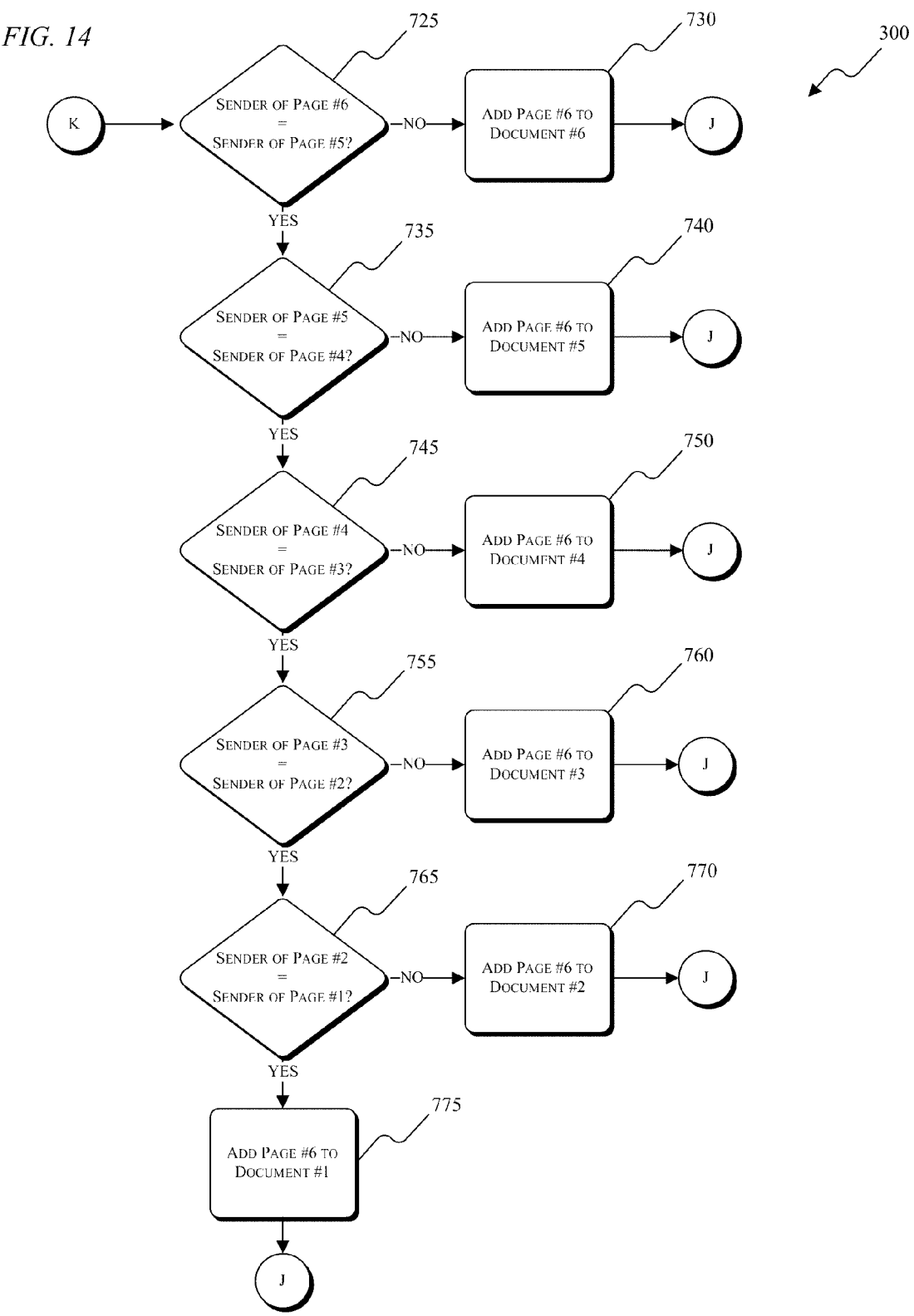
Figure 15:
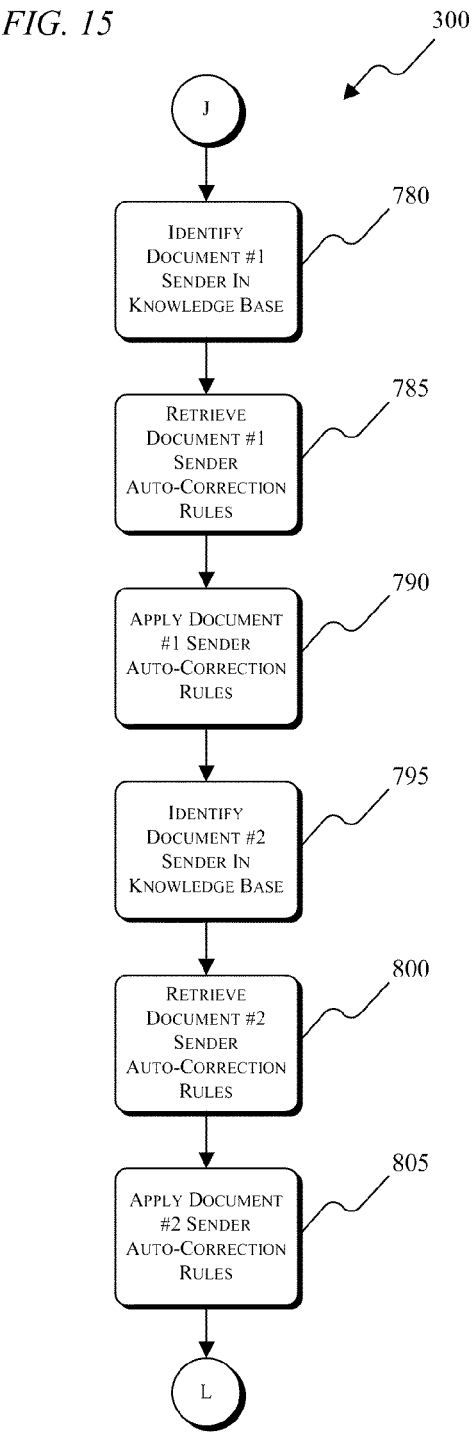
Figure 16:
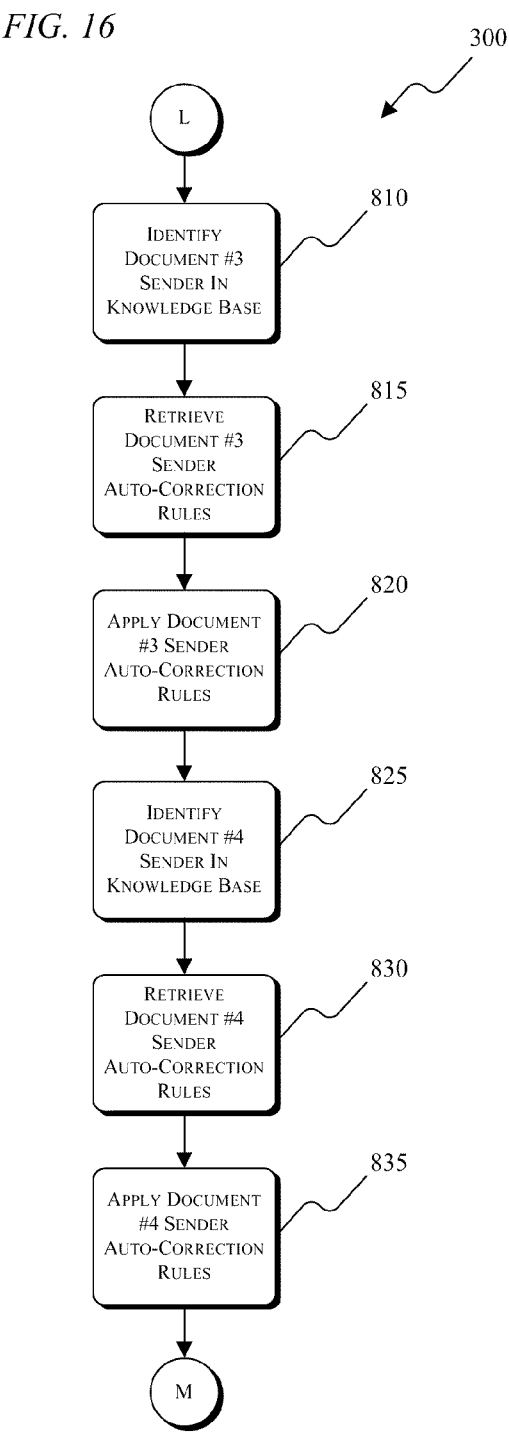
Figure 17:
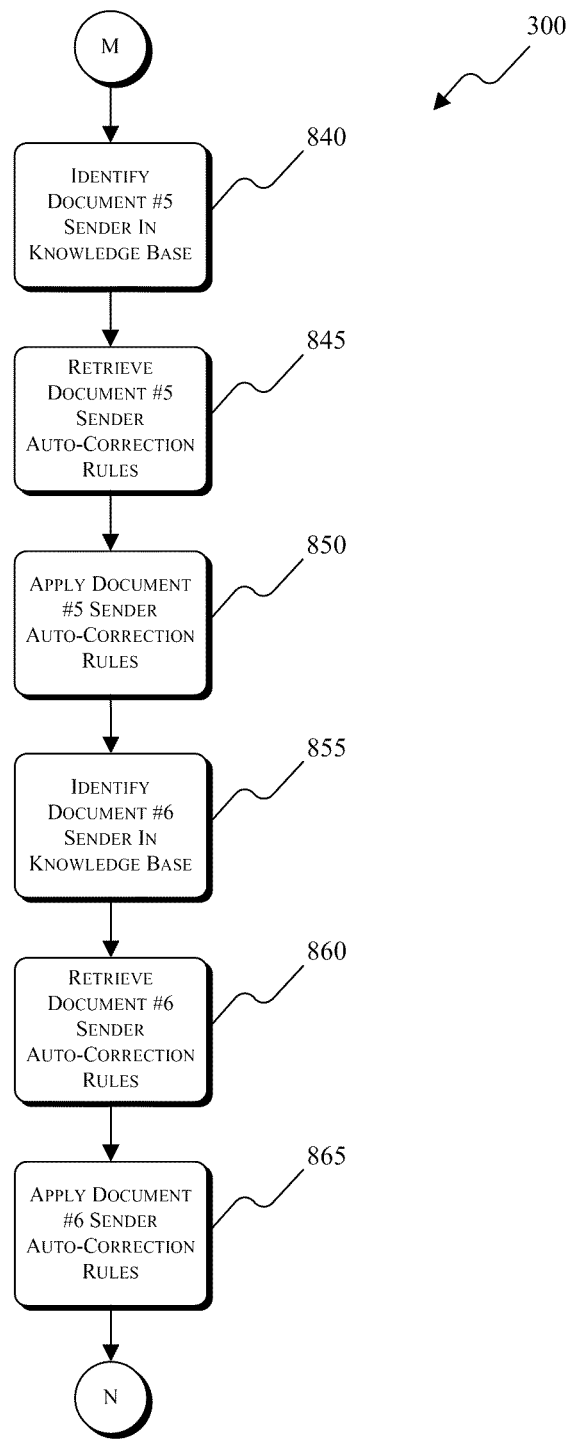

At step 725 of FIG. 14, the sender of page 6 is compared to the sender of page 5. If the sender of page 6 is the not the same as the sender of page 5, page 6 is added to DOCUMENT 6

(step 730) and the process 300 proceeds to control section J. If the sender of page 6 is the same as the sender of page 5, the sender of page 5 is compared to the sender of page 4 (step 735). If the sender of page 5 is the not the same as the sender of page 4, page 6 is added to DOCUMENT 5 (step 740) and the process 300 proceeds to control section J. If the sender of page 5 is the same as the sender of page 4, the sender of page 4 is compared to the sender of page 3 (step 745). If the sender of page 4 is the not the same as the sender of page 3, page 6 is added to DOCUMENT 4 (step 750) and the process 300 proceeds to control section J. If the sender of page 4 is the same as the sender of page 3, the sender of page 3 is compared to the sender of page 2 (step 755). If the sender of page 3 is the not the same as the sender of page 2, page 6 is added to DOCUMENT 3 (step 760) and the process 300 proceeds to control section J. If the sender of page 3 is the same as the sender of page 2, the sender of page 2 is compared to the sender of page 1 (step 765). If the sender of page 2 is not the same as the sender of page 1, page 6 is added to DOCUMENT 2 (step 770) and the process 300 proceeds to control section J. If the sender of page 2 is the same as the sender of page 1, page 6 is added to DOCUMENT 1 (step 775) and the process 300 proceeds to control section J of FIG. 15.

Following step 775, all of the pages of the compilation document have been separated based on sender data. The process 300 described above with respect to FIGS. 5-14 and steps 305-775 is now applied to the six-page compilation document introduced above. As previously described, the six-page compilation document is structured as follows: (1) page 1 is a first document and includes known sender data; (2) pages 2-3 are a second document, include the same sender data, and the sender is unknown; (3) pages 4-5 are a third document, page 4 is a cover sheet, and page 5 includes known sender data; and (4) page 6 is a fourth document and page 6 has the same sender information as page 5.

Applying steps 305-775 to such a compilation document results in the document separations shown below in Table #1.

TABLE #1

Preliminary Document Separation

| Page # | Actual Document for Each Page | Preliminarily Separated Documents for Each Page Based on Sender Data |
|---|---|---|
| 1 | 1 | 1 |
| 2 | 2 | B |
| 3 | 2 | C |
| 4 | 3 | C |
| 5 | 3 | 5 |
| 6 | 4 | 5 |

The preliminary document separation of steps 305-775 results in page 1 being correctly separated. Pages 2 and 3, which are part of the same document, were incorrectly divided between DOCUMENT B and DOCUMENT C. Page 4 was incorrectly combined with page 3 in DOCUMENT C. Page 5 was added to DOCUMENT 5 and incorrectly separated from page 4. Page 6 was incorrectly combined with page 5 and added to DOCUMENT 5. These errors during the preliminary document separation are a result of performing the document separation based solely on sender information.

The preliminary document separation is corrected using multiple techniques. For example, returning to the process 300, if each page of a six-page compilation document includes sender data from a known sender and each page sender is different from the sender of the previous page, DOCUMENTS 1-6 are created. Because each sender is a known sender, each sender includes at least one directory within the knowledge base 125 which is accessed to retrieve automatic correction rules. For example, at step 780, the sender of DOCUMENT 1 is identified in the knowledge base 125. The automatic correction rules stored in the directory are then retrieved (step 785), and applied to each page of DOCUMENT 1 (step 790). The sender of DOCUMENT 2 is then identified in the knowledge base 125 (step 795), the automatic correction rules are retrieved (step 800), and the automatic correction rules are applied to each page of DOCUMENT 2 (step 805). The process 300 then proceeds to control section L shown in and described with respect to FIG. 16, where the sender of DOCUMENT 3 is identified in the knowledge base 125 (step 810), the automatic correction rules are retrieved (step 815), and the automatic correction rules are applied to each page of DOCUMENT 3 (step 820). The sender of DOCUMENT 4 is identified in the knowledge base 125 (step 825), the automatic correction rules are retrieved (step 830), and the automatic correction rules are applied to each page of DOCUMENT 4 (step 835). The process 300 then proceeds to control section M shown in and described with respect to FIG. 17, where the sender of DOCUMENT 5 is identified in the knowledge base 125 (step 840), the automatic correction rules are retrieved (step 845), and the automatic correction rules are applied to each page of DOCUMENT 5 (step 850). The sender of DOCUMENT 6 is identified in the knowledge base 125 (step 855), the automatic correction rules are retrieved (step 860), and the automatic correction rules are applied to each page of DOCUMENT 6 (step 865), and the process 300 proceeds to control section N shown in and described with respect to FIG. 18. As a person of ordinary skill in the art will appreciate, automatically corrected documents are not the same as the compilation document or the preliminarily separated documents. The automatically corrected documents are generated as a result of the application or one or more automatic correction rules. Although all of the pages within a compilation or preliminarily separated document may correspond to a single automatically corrected document, the automatically corrected document is generated based on the analysis of the preliminarily separated document, and is not a mere copy of the compilation document or the preliminarily separated document.

Following the application of the automatic correction rules for DOCUMENT 6, each of the documents with known senders has been automatically corrected. However, as shown above, not every page of the compilation document is necessarily grouped into DOCUMENTS 1-6. Pages that do not include sender data or pages that include sender data from an unknown sender are sometimes grouped into DOCUMENTS A-F. Because the DOCUMENTS A-F do not include sender data from a known sender, there are no directories within the knowledge base 125 that correspond to these documents, and automatic correction cannot be applied. Instead, directories for the documents are created within the knowledge base 125.

Figure 18:
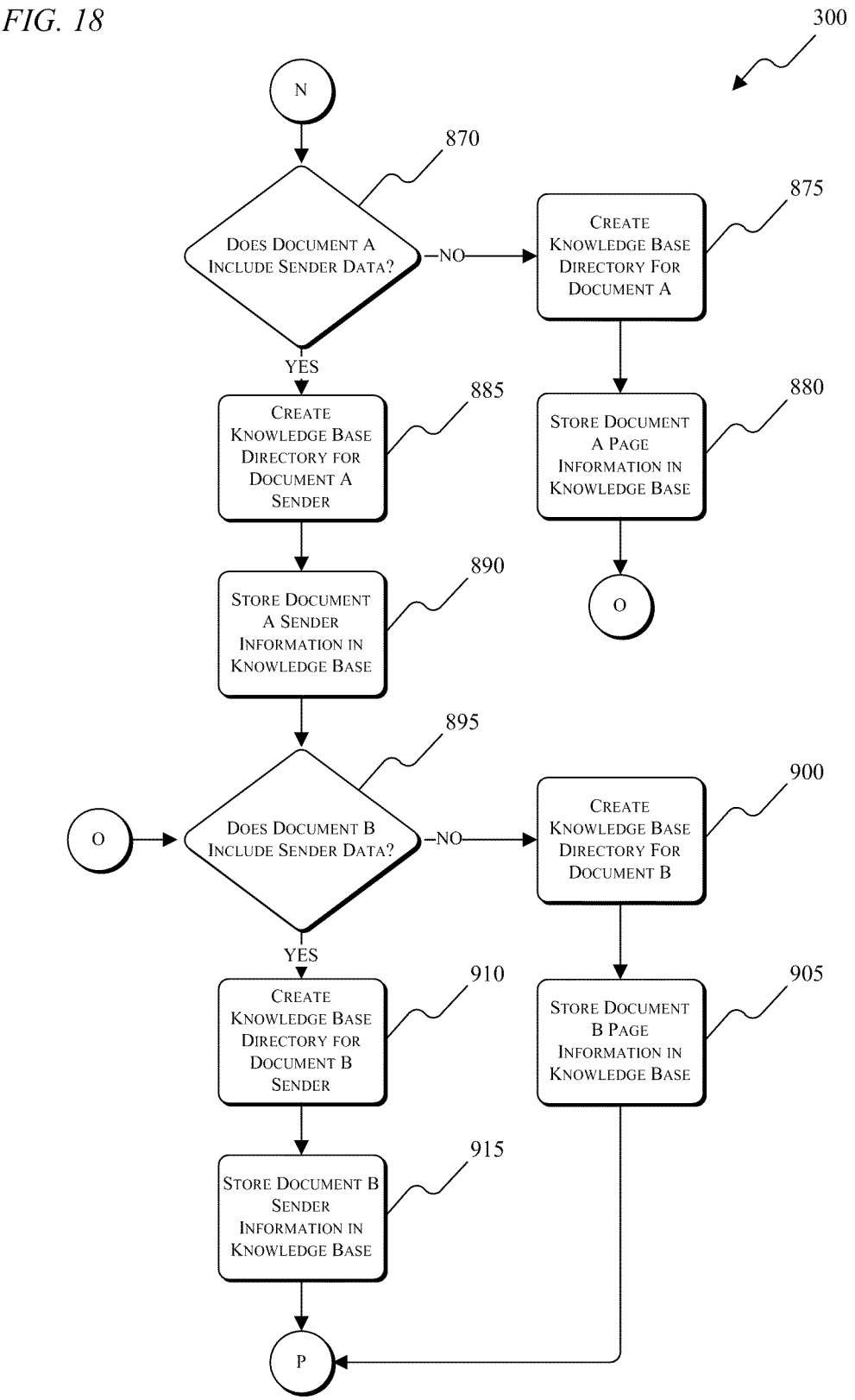

With reference to FIG. 18 and control section N of process 300, the creation of directories within the knowledge base 125 is based on whether the documents include sender data (e.g., sender data from an unknown sender). At step 870, the splitting module 115 determines whether DOCUMENT A includes sender data. If DOCUMENT A does not include sender data, a knowledge base directory is created for DOCUMENT A (step 875), but the information stored in the directory is the page information associated with DOCUMENT A (step 880). The page information for DOCUMENT A includes, for example, one or more pieces of extracted information from the pages within DOCUMENT A, one or more pieces of metadata, or any combination thereof. In some embodiments, the knowledge base directory is created according to a timestamp for when the first page of DOCUMENT A was scanned, sent to the host device, received by the host device, etc. In other embodiments, all of the extractable information from the pages within DOCUMENT A is stored in the corresponding knowledge base directory in order to facilitate the matching of the pages within DOCUMENT A to a previously known sender, a new unknown sender, or a sender that is later added to the knowledge base 125. At such a time when the pages within DOCUMENT A are matched to a sender within the knowledge base 125, all or a portion of the pages within DOCUMENT A and the corresponding extracted and stored data are transferred to that sender's directory. If the directory corresponding to DOCUMENT A is empty (e.g., all of the pages have been associated with other senders) the splitting module 115 or the knowledge base 125 removes (e.g., deletes, overwrites, etc.) the directory.

Following step 880, the process 300 proceeds to control section O. If, at step 870, DOCUMENT A includes sender data, a knowledge base directory is created for the sender (step 885) and sender information is stored in the directory (step 890). For example, the directory is created based on one or more of a sender name, sender address, sender phone number, client number, fax number, email address, or the like. After step 890, the same process is executed for DOCUMENT B. The splitting module 115 determines whether DOCUMENT B includes sender data (step 895). If DOCUMENT B does not include sender data, a knowledge base directory is created for DOCUMENT B (step 900), DOCUMENT B page information is stored in the directory (step 905), and the process 300 proceeds to control section P shown in and described with respect to FIG. 19. If, at step 895, DOCUMENT B includes sender data, a knowledge base directory is created for the sender (step 910), sender information is stored in the directory (step 915), and the process 300 proceeds to FIG. 19 and control section P.

Figure 19:
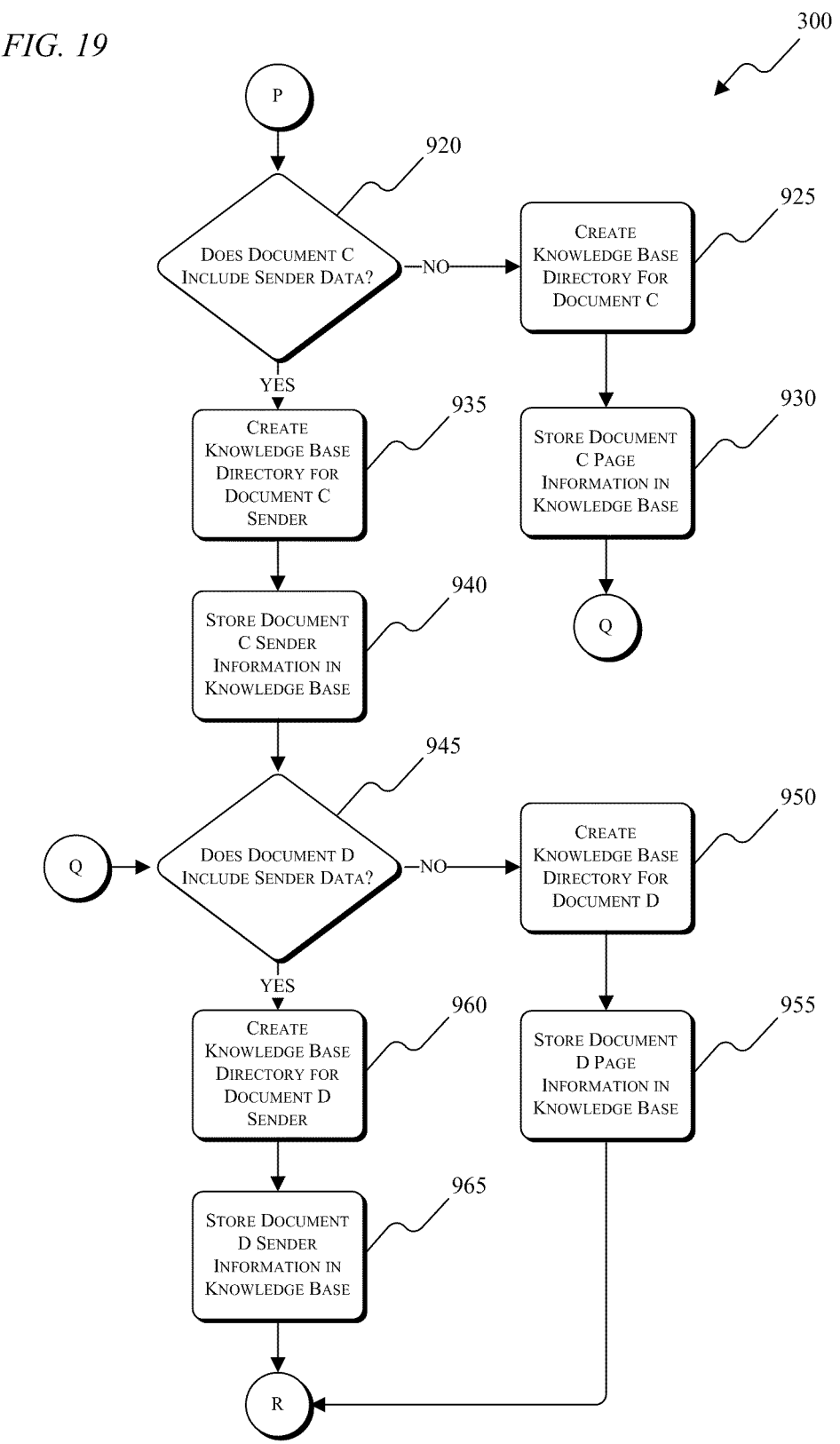

With reference to FIG. 19 and control section P, the splitting module 115 determines whether DOCUMENT C includes sender data (step 920). If DOCUMENT C does not include sender data, a knowledge base directory is created for DOCUMENT C (step 925), DOCUMENT C page information is stored in the directory (step 930), and the process 300 proceeds to control section Q. If, at step 920, DOCUMENT C includes sender data, a knowledge base directory is created for the sender (step 935) and sender information is stored in the directory (step 940). At step 945, the splitting module 115 determines whether DOCUMENT D includes sender data (step 945). If DOCUMENT D does not include sender data, a knowledge base directory is created for DOCUMENT D (step 950), DOCUMENT D page information is stored in the directory (step 955), and the process 300 proceeds to control section R shown in and described with respect to FIG. 20. If, at step 945, DOCUMENT D includes sender data, a knowledge base directory is created for the sender (step 960), the sender information is stored in the directory (step 965), and the process 300 proceeds to FIG. 20 and control section R.

Figure 20:
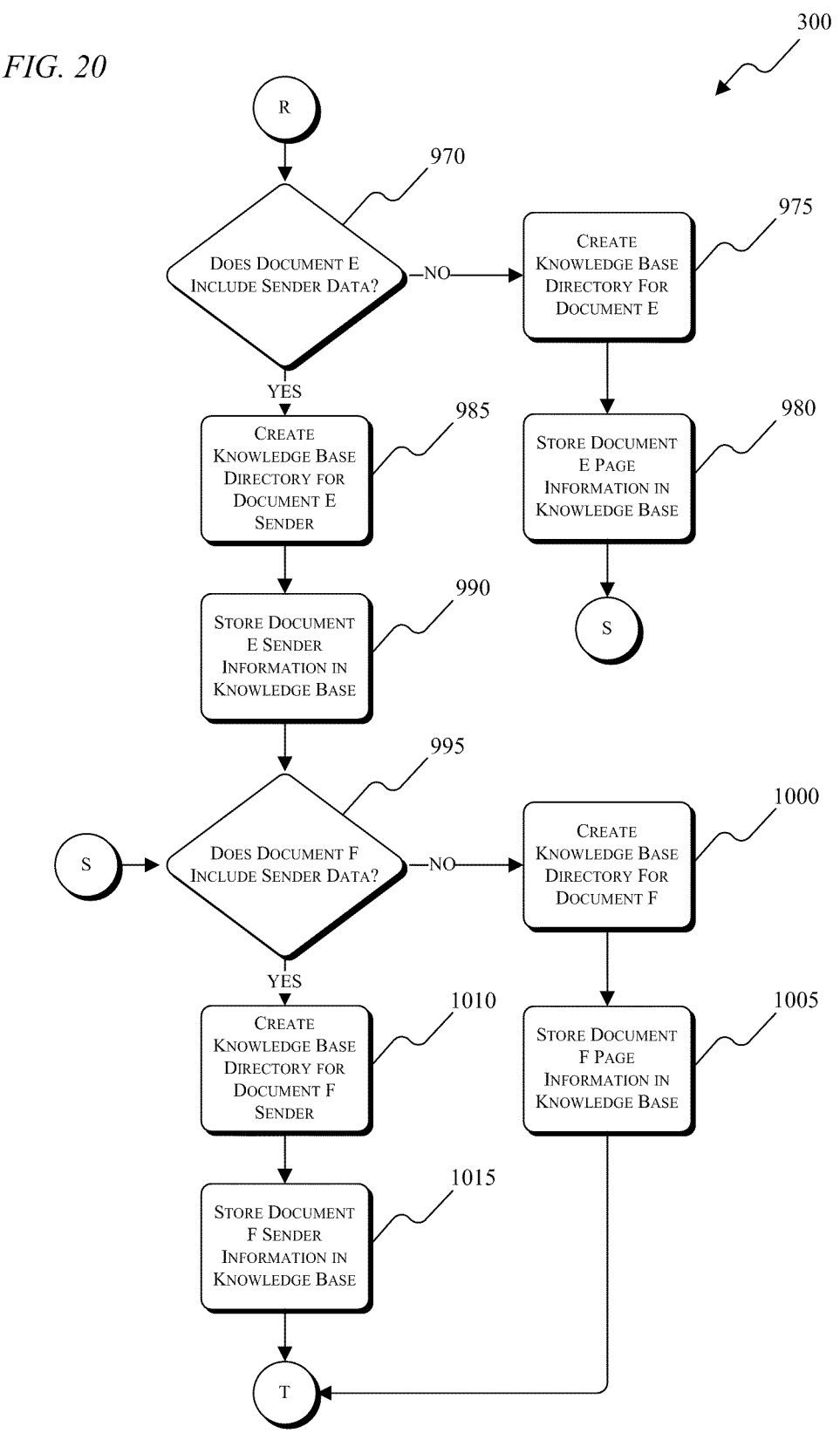

At step 970 of FIG. 20, the splitting module determines whether DOCUMENT E includes sender data. If DOCUMENT E does not include sender data, a knowledge base directory is created for DOCUMENT E (step 975), DOCUMENT E page information is stored in the directory (step 980), and the process 300 proceeds to control section S. If, at step 970, DOCUMENT E includes sender data, a knowledge base directory is created for the sender (step 985) and sender information is stored in the directory (step 990). At step 995, the splitting module 115 determines whether DOCUMENT F includes sender data. If DOCUMENT F does not include sender data, a knowledge base directory is created for DOCUMENT F (step 1000), DOCUMENT F page information is stored in the directory (step 1005), and the process 300 proceeds to control section T shown in and described with respect to FIG. 21. If, at step 995, DOCUMENT F includes sender data, a knowledge base directory is created for the sender (step 1010), the sender information is stored in the directory (step 1015), and the process 300 proceeds to FIG. 21 and control section T.

Figure 21:
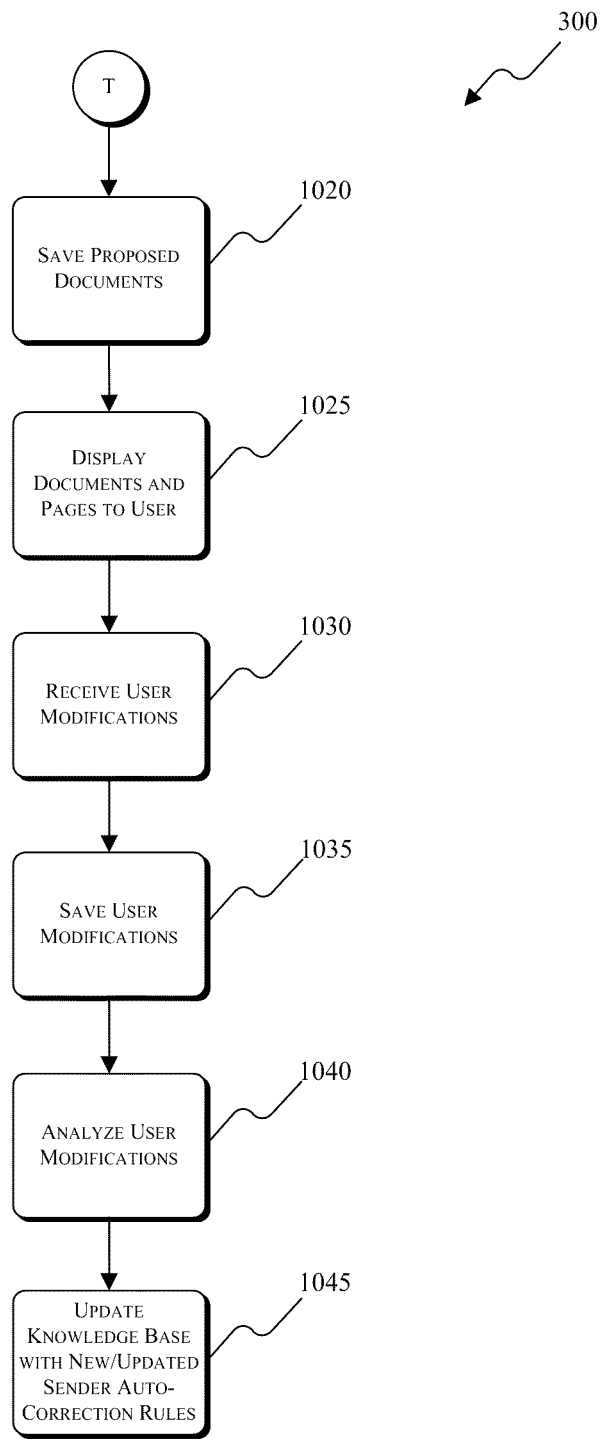

With reference to FIG. 21, the preliminarily separated and automatically corrected documents are saved as proposed documents (step 1020) to, for example, the knowledge base 125 or another memory which is accessible by the correction module 120. The saved documents are then displayed or made ready for display to a user (step 1025). For example, the saved documents are displayed or are accessible through a website or webpage using the user interface module 110. In some embodiments, a user uses a browser to access a webpage and view the documents. Using the user interface module 110, the user modifies the saved documents, and the modifications are received by the host device (step 1030) to correct any errors that were made during the preliminary document separation that were not corrected by the automatic correction rules. The user's modifications are saved (step 1035) by, for example, the knowledge base 125, which then analyzes the user modifications (step 1040) to learn from the corrections. The knowledge base 125 is then updated with new or updated automatic correction rules (step 1045).

Figure 22:
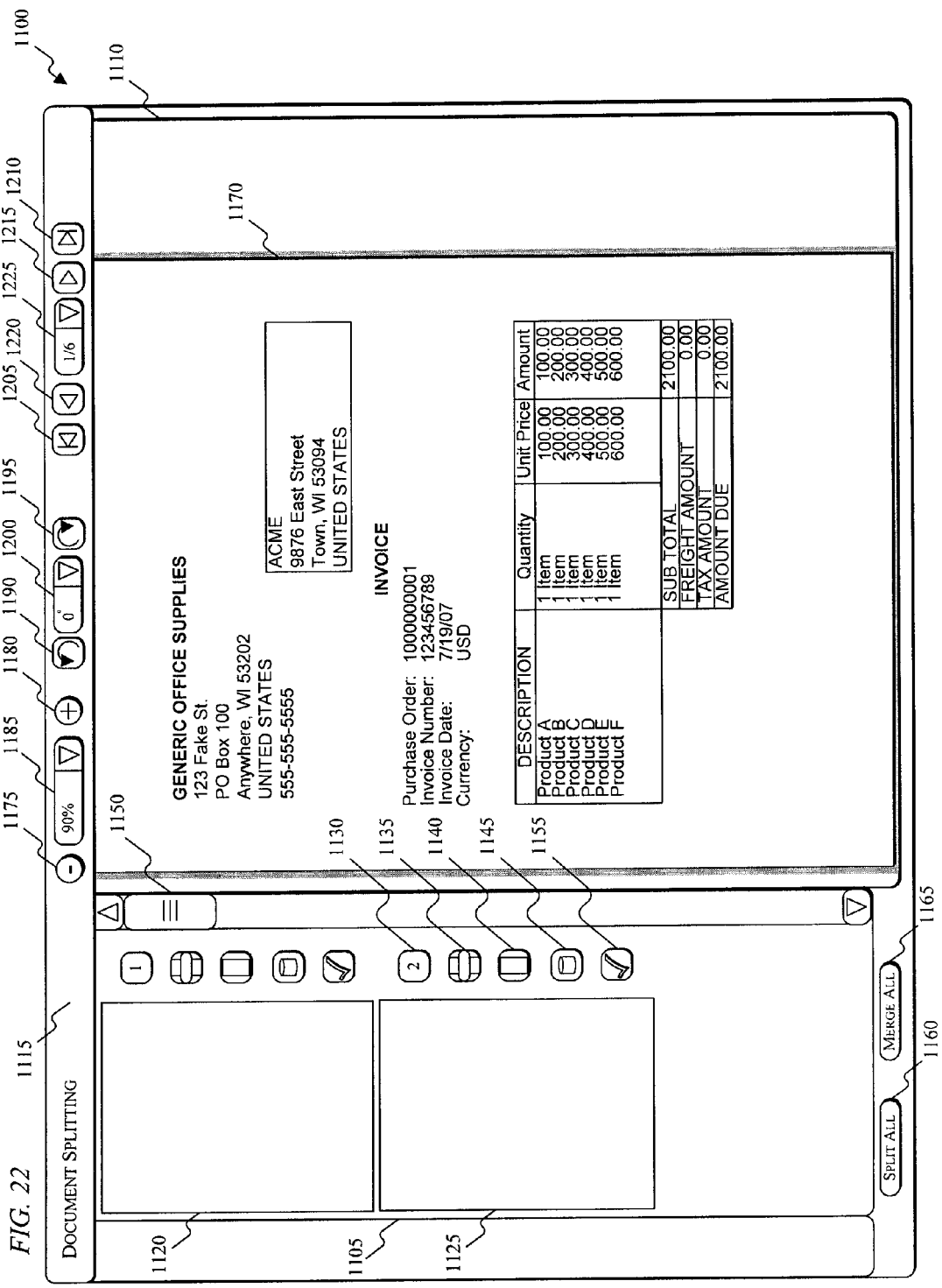
FIG. 22 illustrates a manual document splitting user interface.
Figure 23:
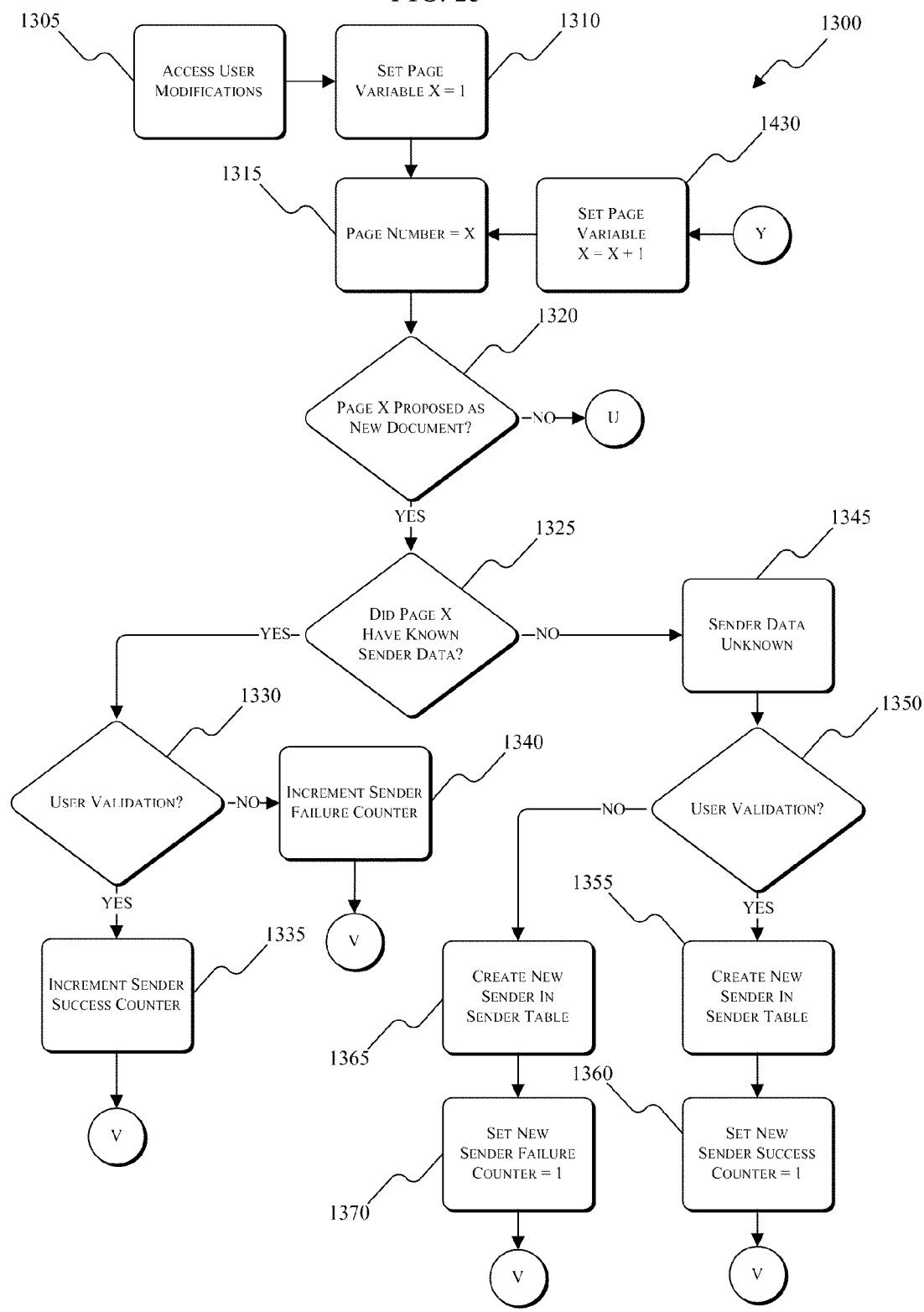

FIG. 22 illustrates a user interface 1100 for receiving modifications from a user. The interface 1100 includes a plurality of input portions (e.g., text boxes, check boxes, etc.) for receiving selections from a user. For example, in one embodiment, the user populates the input portions of the user interface 1100 by entering text via a mechanical or virtual keyboard of a client device, and using a pointing or selection device such as a mouse to control a curser on a display screen. Input signals from the keyboard and the mouse are received and processed by a computer (e.g., including a processor and a memory) and translated into a visual result or action in the interface 1100. For example, if the user enters text using a keyboard, the activated keys produce signals which are represented as type-written text in the user interface 1100. Similarly, a mouse click which corresponds to a location of the cursor on the screen results in selecting/deselecting a check box, highlighting text, etc. In other embodiments, the user interface 1100 is accessed using a touch-screen device and a user's finger strokes or tapping are used to populate the input portions.

The interface 1100 includes three main sections. A document section 1105 includes a thumbnail-type image of each page of a document. In the embodiment illustrated in FIG. 22, the document section is capable of displaying approximately three pages at a single time. A page section 1110 includes an exploded, magnified, or enhanced view of a single of the pages from the document section, and a navigation menu 1115 enables a user to control page zoom, page rotation, and page selection.

The document section 1105 includes thumbnail-type images 1120 and 1125 of each page in a document. Various controls and indicators are provided to enable a user to edit the proposed document separations. For example, a page indicator 1130 provides an indication of the number of each page in a particular document, and linking button 1135 allows a user to link a page to or unlink a page from a document. For example, the proposed document illustrated in FIG. 22 includes two pages. If the first page and the second page were incorrectly added to the same document, selecting the linking button 1135 will unlink the two pages. Similarly, if two pages are displayed that are not currently in the same document but should be in the same document, the linking button 1135 combines the two pages into a single document. In the event that a page is unlinked from a proposed document, a new document button 1140 is used to indicate that the selected page should be a part of a new document. With only a single proposed document being displayed, the user may want or need to view the other pages from the compilation document. For example, if a page was incorrectly added to a document and then unlinked from that document, subsequent pages from the compilation document may need to be linked with that page. In such an instance, a database or page repository button 1145 is used to access and view all of the pages from a particular compilation document. In some embodiments, the database button 1145 is used to switch between the document section 1105 displaying a single proposed document and the document section 1105 displaying all of the pages of a given compilation document. In the event of the compilation document including more pages than are viewable in the document section 1105, a scroll bar 1150 is included to scroll through the pages. Additionally or alternatively, a zoom factor of the document section 1105 is adjustable to allow more or fewer pages to be displayed at a single time. In some embodiments, a pop-up window or tab is opened with displays each of the pages in the compilation document and the proposed document separation for each page.

When viewing all of the pages of a compilation document, the linking and new document buttons 1135 and 1140 are used to combine or separate pages as needed. When each page of the compilation document has been properly separated, a page OK or acknowledgement button 1155 is selected to indicate that the page has been properly separated. In some embodiments, a single acknowledgement button 1155 for each document is used to indicate that all of the pages of the document have been properly separated. The document section 1105 also includes two buttons that apply changes to all of the pages in a single proposed document or all of the pages in the compilation document. A split all button 1160 is used to unlink or separate each page of a proposed document or the compilation document. The split all button 1160 is used, for example, when the preliminary document separation and the automatic corrections failed to correctly separate a high percentage of the pages. After all of the pages have been split, the user is able to start fresh and combine individual pages as necessary. A merge all button 1165 is also provided to link all of the pages of, for example, the compilation document into a single document. In some embodiments, the interface 1100 allows pages to be split, for example, every two pages or every three pages.

The page section 1110 provides an enhanced or magnified image 1170 of a selected page. For example, in the illustrated embodiment, page 1 of the document is displayed at a 90% zoom factor in the page section 1110. The ability to view individual pages at a larger size allows the user to more readily determine whether individual documents should be grouped together or separated. The display of the selected page is controlled using the navigation menu 1115. The navigation menu 1115 includes a zoom-out button 1175, a zoom-in button 1180, a zoom selection drop-down menu 1185, a rotate-counterclockwise button 1190, a rotate-clockwise button 1195, a rotation selection drop-down menu 1200, a first-page button 1205, a last-page button 1210, a page-forward button 1215, a page-back button 1220, and a page selection drop-down menu 1225. The controls in the navigation menu 1115 are applicable to either the page displayed in the page section 1110, as well as the pages displayed in the document section 1105. For example, if a page is scanned upside down, the rotate-counterclockwise button 1190, the rotate-clockwise button 1195, and the rotation selection drop-down menu 1200 are used to correct the orientation of the page. The zoom-out button 1175, the zoom-in button 1180, and the zoom selection drop-down menu 1185 are also used to control the document section 1105 to allow more or fewer pages to be displayed at a single time.

The user interface 1100 is used to correct the errors made during the preliminary document separation that were not corrected by the automatic correction of the document separation. Returning to the compilation document provided above in Table #1, the errors in document separation are manually corrected as shown below in Table #2.

TABLE #2

Manual Correction

| Page # | Preliminarily Separated Documents for Each Page Based on Sender Data | Manually Separated Documents for Each Page After User Correction |
|---|---|---|
| 1 | 1 | 1 |
| 2 | B | B |
| 3 | C | B |
| 4 | C | C |
| 5 | 5 | C |
| 6 | 5 | 5 |

The transitions between the preliminary document separation and the final document separation are analyzed by the knowledge base 125 to learn from the errors that were made, and update the knowledge base 125 and the automatic correction rules to increase the efficiency (e.g., percentage of correct document separations) the system is able to provide. The greater the efficiency of the automatic document separation, the less user intervention is required. The modifications made by the user are stored in, for example, the knowledge base 125 or a memory accessible by the knowledge base 125. As a person of ordinary skill in the art will appreciate, manually separated or corrected documents are not the same as the compilation document, the preliminarily separated documents, or the automatically corrected documents. The manually corrected documents are generated as a result of the input received from a user. Although all of the pages within a manually corrected document may correspond to the pages of a single compilation document, preliminarily separated document, or automatically corrected document, the manually corrected document is generated following the receipt of user corrections of the document separation or user acknowledgement of the document separation, and is not a mere copy of the compilation document, the preliminarily separated document, or the automatically corrected document. For descriptive purposes, it is assumed that the automatic correction described above had no affect on the preliminary document separation, and the manual corrections were made directly to the preliminary document separation. The analysis of the manual corrections is described in greater detail below.

A process 1300 for analyzing manual corrections or modifications made to the document separation by the user is illustrated in FIGS. 23-30. At step 1305, the user modifications are accessed from, for example, the knowledge base 125. The modifications are analyzed with respect to each individual page of the compilation document and, in some instances, the relationships between neighboring pages. For descriptive purposes, a single iteration of the analysis is provided in detail. The knowledge base 125 steps through each of the pages using, for example, variables, counters, registers, or a processor to keep track of which pages have been analyzed.

In the illustrated embodiment, various page variables are set and the values of the page variables are modified to step through the pages of the compilation document. At step 1310, a PAGE VARIABLE X is initialized and set to a value equal to one. A PAGE NUMBER is then set to the value of X (step 1315). The knowledge base 125 determines whether PAGE X was proposed as a new document (step 1320) (e.g., proposed as a new document following the preliminary document separation). If PAGE X was not proposed as a new document, the process 1300 proceeds to control section U shown in and described with respect to FIG. 24. If PAGE X was proposed as a new document, the knowledge base 125 determines whether PAGE X had a known sender (step 1325). If PAGE X had a known sender, the knowledge base 125 determines whether the user validated PAGE X as being part of a new document (step 1330). If the user provided validation at step 1330, a sender success counter is incremented (step 1335) and the process 1300 proceeds to control section V shown in and described with respect to FIG. 24. If the user did not provide validation (e.g., made a correction to PAGE X), a sender failure counter is incremented (step 1340) and the process 1300 proceeds to control section V.

If, at step 1325, PAGE X did not have known sender data, the sender data of PAGE X is unknown (step 1345). If the user provides validation (step 1350) that it was correct to propose PAGE X as a new document, a new sender is added to a sender table (step 1355) of the knowledge base 125. The sender table is a table which is accessed by the splitting module 115 to retrieve automatic correction rules. After the sender is added to the sender table, a sender success counter for the new sender is incremented (e.g., set equal to one) (step 1360) and the process 1300 proceeds to control section V. If the user did not provide validation that PAGE X was a new document (e.g., PAGE X was part of a previous document), a new sender is added to the sender table based on, for example, page information, (step 1365), and a sender failure counter for the new sender is incremented (step 1370). In the illustrated embodiment, a page is only proposed as a new document when identifiable sender data is present, which simplifies the analysis of user modifications. In other embodiments, sender data is not the only criteria used to perform the preliminary document separation, and pages are proposed as new documents for other reasons (e.g., dates, times, number of pages, etc.). However, the logic provided herein is adaptable to any number of additional separation criteria with little modification because the analysis of the document separation is based primarily on user acknowledgement of the document separations. Following step 1370, the process 1300 proceeds to control section V.

Figure 24:
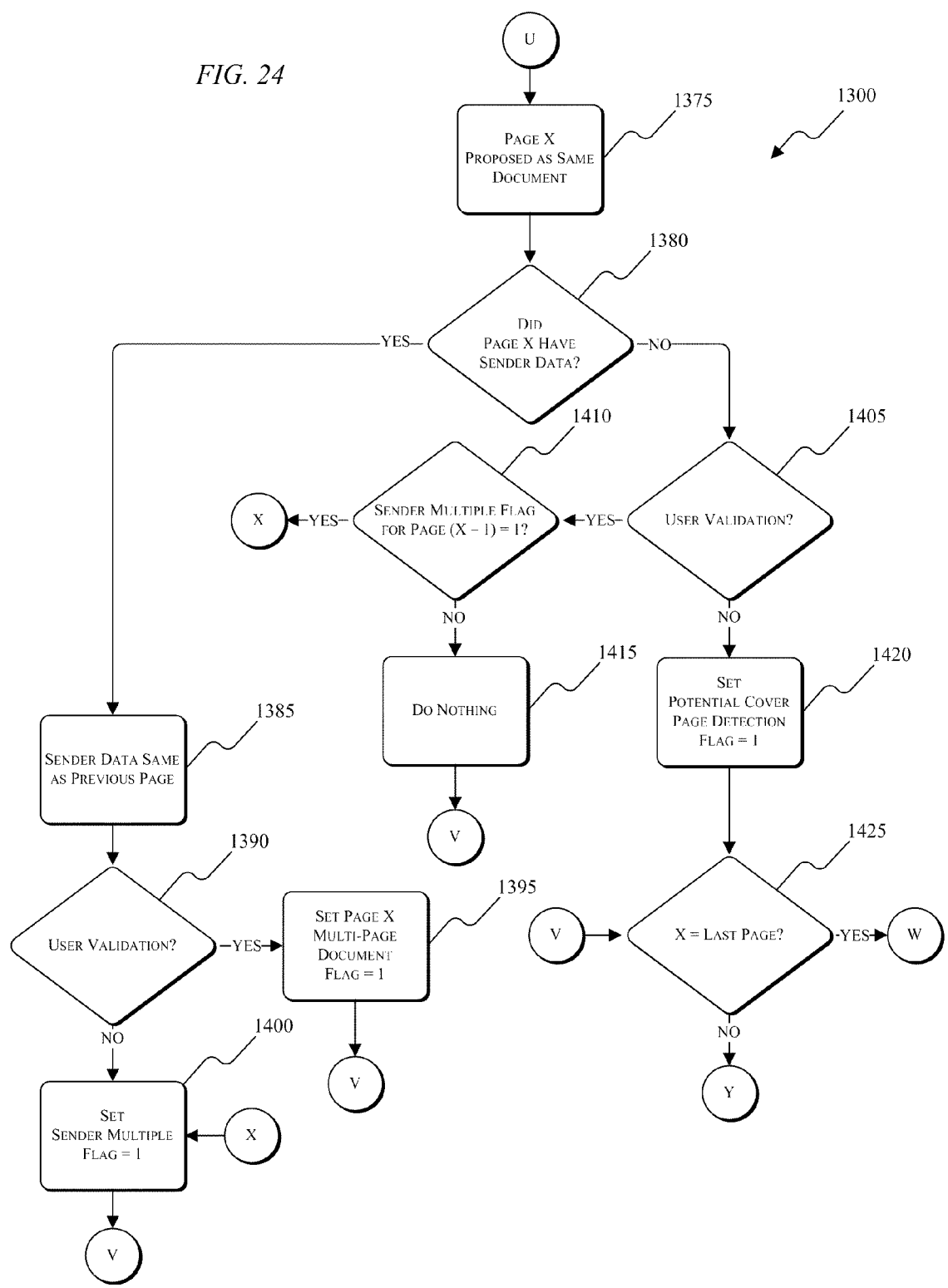

With reference to control section U and FIG. 24, the knowledge base 125 identifies that PAGE X was proposed as the same document (e.g., the same document as the previous page or pages in the compilation document) (step 1375). The knowledge base 125 then determines whether PAGE X included sender data (step 1380). If PAGE X did include sender data, the sender data was proposed as the being the same sender data as the previous page of the compilation document (step 1385). If the user provided validation (step 1390), a multi-page document flag is set equal to one (step 1395) to indicate that the document including PAGE X includes multiple pages. As such, PAGE X is at least the second page of such a document. If the user does not provide validation at step 1390, a sender multiple flag is set equal to one (step 1400) to indicate that the compilation document includes multiple independent documents from the same sender. Following each of steps 1395 and 1400, the process 1300 proceeds to control section V.

If, at step 1380, PAGE X did not include sender data, the knowledge base determines whether the user provided validation (step 1405) for the PAGE X being a part of the same document. If the user validated that PAGE X was the same document, the knowledge base 125 determines whether the sender multiple flag for the previous page (i.e., PAGE (X−1)) was set equal to one (step 1410). If the sender multiple flag of the previous page was set equal to one (e.g., the previous page was a part of a second consecutive independent document from the same sender), the sender multiple flag for PAGE X is also set equal to one (step 1400). If the sender multiple flag for the previous page was not set to one, no action is taken (step 1415) and the process proceeds to control section V. If, at step 1405, the user did not validate that PAGE X was a part of the same document as the previous page, a potential cover page detection flag is set equal to one (step 1420). The potential cover page detection flag indicates that PAGE X may be a cover page for a document within the compilation document. The status of the identification of PAGE X as a cover page is evaluated later in process 1300. Following step 1420 and in control section V, the knowledge base 125 determines whether PAGE X is the last page of the compilation document (step 1425). If PAGE X is not the last page of the compilation document, the process 1300 proceeds to control section Y shown in and described with respect to FIG. 23, where the PAGE VARIABLE X is incremented (step 1430). If PAGE X is the last page of the compilation document, the process 1300 proceeds to control section W shown in and described with respect to FIG. 25.

Figure 25:
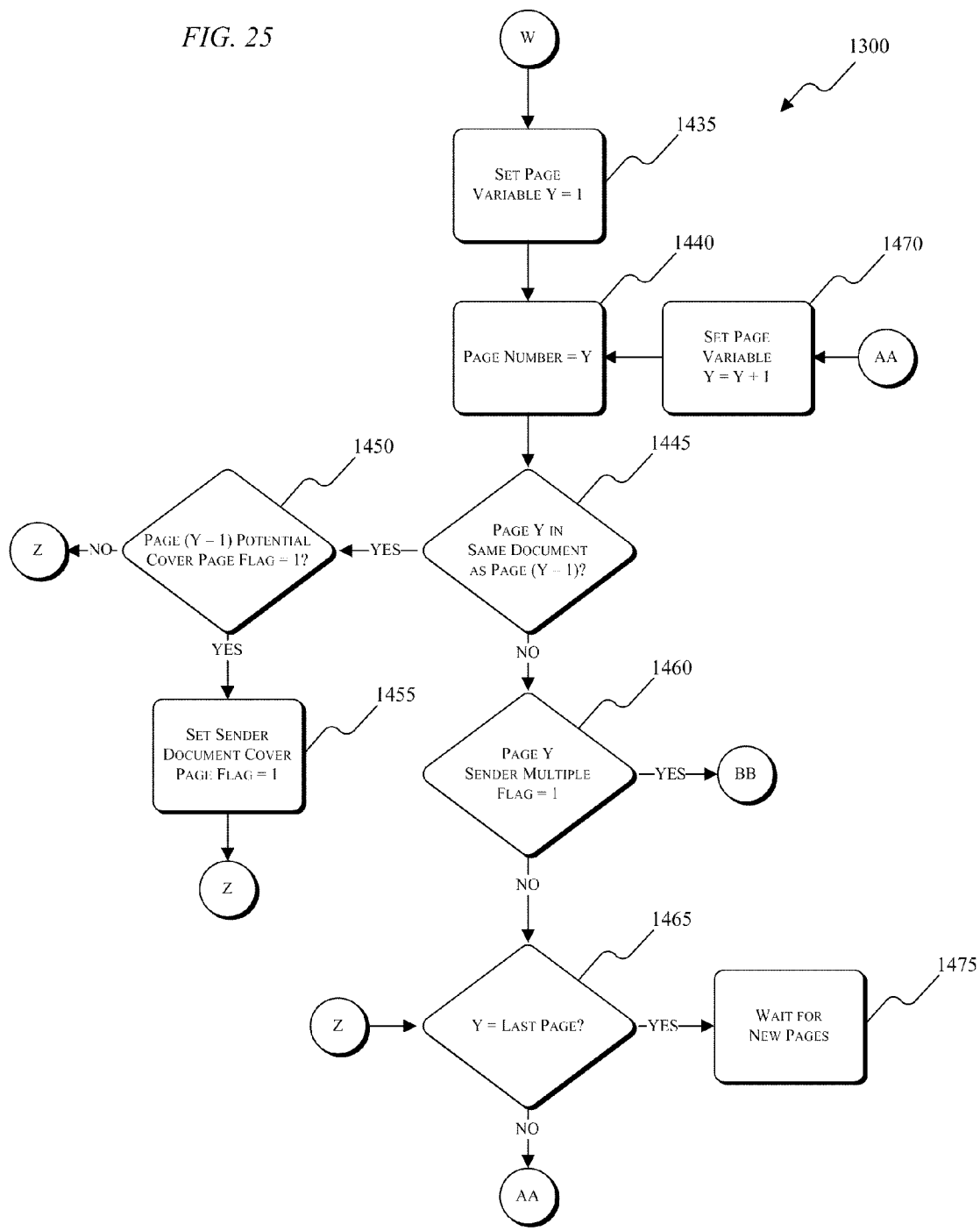

With reference to FIG. 25 and control section W, the process 1300 performs an evaluation to determine whether the potential cover page flag or the sender multiple flag is set for each page of the compilation document. At step 1435, a PAGE VARIABLE Y is initialized and set equal to one, and then a PAGE NUMBER is set equal to the PAGE VARIABLE Y (step 1440). The knowledge base 125 then determines whether PAGE Y was in the same document as PAGE (Y−1) (step 1445). If PAGE Y was in the same document as PAGE (Y−1), the knowledge base 125 determines whether the potential cover page flag for PAGE (Y−1) is equal to one (step 1450). If the potential cover page flag for PAGE (Y−1) is equal to one, a sender document cover page flag is set equal to one (step 1455) to indicate that PAGE (Y−1) was a cover page for the document and the process 1300 proceeds to control section Z. If the potential cover page flag for PAGE (Y−1) is not set equal to 1, the process 1300 proceeds to control section Z. If, at step 1445, PAGE Y was not in the same document as PAGE (Y−1), the knowledge base 125 determines whether the sender multiple flag for PAGE Y is set equal to one (step 1460). If the sender multiple flag for PAGE Y is set equal to one, the process 1300 proceeds to control section BB shown in and described with respect to FIG. 26. If the sender multiple flag for PAGE Y is not set equal to 1, the knowledge base 125 determines whether PAGE Y is the last page of the compilation document (step 1465). If PAGE Y is not the last page of the compilation document, the process 1300 proceeds to control section AA where the PAGE VARIABLE Y is incremented (step 1470). If PAGE Y is the last page of the compilation document, the document separation system waits for new pages to separate and analyze (step 1475).

Figure 26:
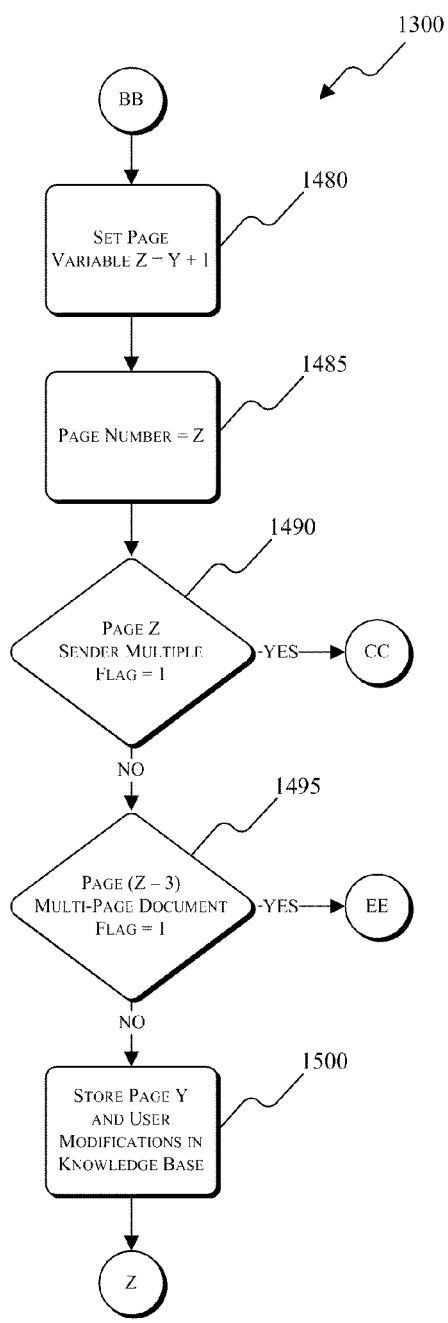

With reference to FIG. 26 and control section BB, a subroutine of process 1300 is executed to analyze the multiple documents from the same sender. This analysis requires the compilation document to include at least three pages and at least two documents. If these criteria are not met, the analysis cannot be performed and the knowledge base 125 waits for additional compilation documents to be provided to the document separation system before the analysis is completed. At step 1480, a PAGE VARIABLE Z is set equal to PAGE VARIABLE (Y+1) (i.e., the page following PAGE Y). A PAGE NUMBER is then set equal to the PAGE VARIABLE Z (step 1485). The knowledge base 125 determines whether the sender multiple flag for PAGE Z is equal to one (step 1490). If the sender multiple flag for PAGE Z is set equal to one, the process 1300 proceeds to control section CC shown in and described with respect to FIG. 27. Because the sender multiple flag for PAGE Y is equal to one, the compilation document includes at least two documents. If, at step 1490, the sender multiple flag for PAGE Z is also equal to one, PAGE Y and PAGE Z are in the same document and the compilation document includes at least three pages. If the sender multiple flag for PAGE Z is not set equal to one, the knowledge base 125 determines whether the multi-page document flag for PAGE (Z−3) (i.e., PAGE Y−2) is set equal to 1 (step 1495) (i.e., the previous document included multiple pages). If the multi-page document flag for PAGE (Z−3) is set equal to 1, the compilation document includes at least two documents and at least three pages, and process 1300 proceeds to control section EE shown in and described with respect to FIG. 28. If the multi-page document flag for PAGE (Z−3) is not equal to one, PAGE Y and any manual user modifications are stored by the knowledge base 125 (step 1500) because there are not enough pages or not enough documents within the compilation document to complete this portion of the analysis of the user's modifications to the document separation. Following step 1500, the process 1300 proceeds to control section Z to determine whether PAGE Y is the last page of the compilation document.

Figure 27:
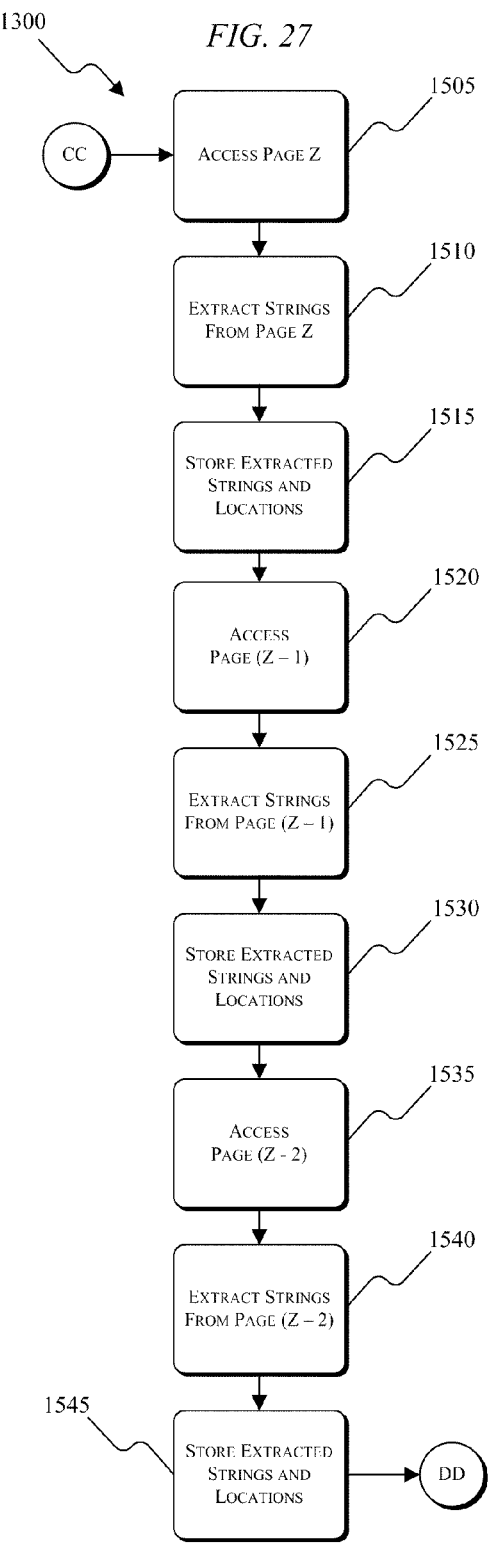

With reference to FIG. 27 and control section CC, PAGE Z is accessed (step 1505) from, for example, the document store 130 or another memory accessible by the knowledge base 125. Data strings (e.g., letters, numbers, words, phrases, symbols, etc.) within PAGE Z are extracted (step 1510) using, for example, OCR or a similar extraction technique. The extracted strings and the locations of the extracted strings within PAGE Z are stored in, for example, the knowledge base 125 or another memory accessible by the knowledge base 125 (step 1515). PAGE (Z−1) (i.e., PAGE Y) is then accessed (step 1520), the strings within PAGE (Z−1) are extracted (step 1525), and the extracted strings and the locations of the extracted strings within PAGE (Z−1) are stored (step 1530). Following step 1530, PAGE (Z−2) (i.e., PAGE (Y−1)) is accessed (step 1535), the strings within PAGE (Z−2) are extracted (step 1540), and the extracted strings and the locations of the extracted strings within PAGE (Z−2) are stored (step 1545). Following step 1545, the process 1300 proceeds to control section DD shown in and described with respect to FIG. 29.

With reference to FIG. 28 and control section EE, PAGE (Z−1) (i.e., PAGE Y) is accessed (step 1550) from, for example, the document store 130 or another memory accessible by the knowledge base 125. Strings within PAGE (Z−1) are extracted (step 1555), and extracted strings and the locations of the extracted strings within PAGE (Z−1) are stored in, for example, the knowledge base 125 or another memory accessible by the knowledge base 125 (step 1560). PAGE (Z−2) (i.e., PAGE (Y−1)) is then accessed (step 1565), the strings within PAGE (Z−2) are extracted (step 1570), and the extracted strings and the locations of the extracted strings within PAGE (Z−2) are stored (step 1575). Then, PAGE (Z−3) (i.e., PAGE (Y−2)) is accessed (step 1580), the strings within PAGE (Z−3) are extracted (step 1585), and the extracted strings and the locations of the extracted strings within PAGE (Z−3) are stored (step 1590). Following step 1590, the process 1300 proceeds to control section FF shown in and described with respect to FIG. 29.

With reference to FIG. 29 and control sections DD and FF, either the extracted strings from PAGES Z, (Z−1), and (Z−2) are retrieved (step 1595), or the extracted strings from PAGES (Z−1), (Z−2), and (Z−3) are retrieved (step 1600), based on the outcome of steps 1490 and 1495 described above. For the retrieved pages, all of the strings that have the same value (e.g., are identical) which are positioned at the same location (e.g., have the same coordinates) within each page are removed (step 1605). Following step 1605, all of the strings that are positioned at the same location in each page but always have different values are removed (step 1610). Then, all of the strings which have no equivalent at the same location in any of the other pages are removed (step 1615) (e.g., strings which are unique to a single page). Next, the knowledge base 125 identifies the remaining strings within PAGE (Z−1) (i.e., PAGE Y) that are different from the remaining strings in the other pages of the same document (i.e., PAGE Z) (step 1620). If PAGES (Z−1), (Z−2), and (Z−3) are being analyzed, and PAGE (Z−1) is the only page of a document, all of the remaining strings within PAGE (Z−1) satisfy the criteria of step 1620. Following step 1620, the knowledge base 125 identifies additional documents, if any, from the sender of PAGE (Z−1) which were previously analyzed and stored (e.g., in the document store or another memory accessible by the knowledge base) (step 1625). The strings identified in step 1620 are then compared to the strings identified for the first pages of other documents from the sender of PAGE (Z−1) (step 1630). Any of the identified strings which are identical between PAGE (Z−1) and the previously analyzed first pages from the sender of PAGE (Z−1) are stored by the knowledge base 125 as first page criteria (step 1635). The process 1300 then proceeds to control section GG shown in and described with respect to FIG. 30. In the event that there are no additional first pages from the sender of PAGE (Z−1) that were previously analyzed, all of the strings identified at step 1620 are stored as first page criteria. Then, as additional pages are analyzed, the first page criteria are modified and updated.

Figure 30:
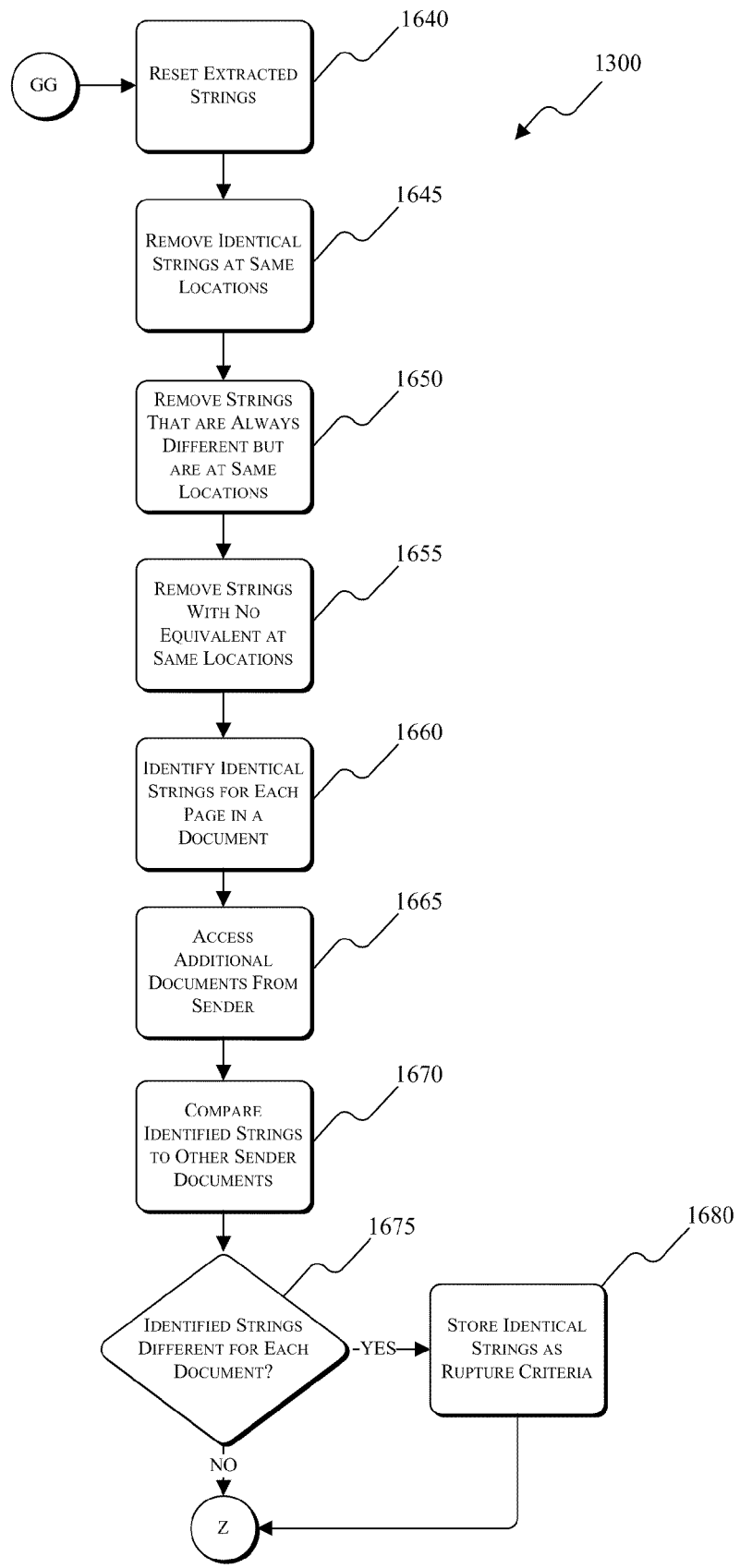
Figure 31:
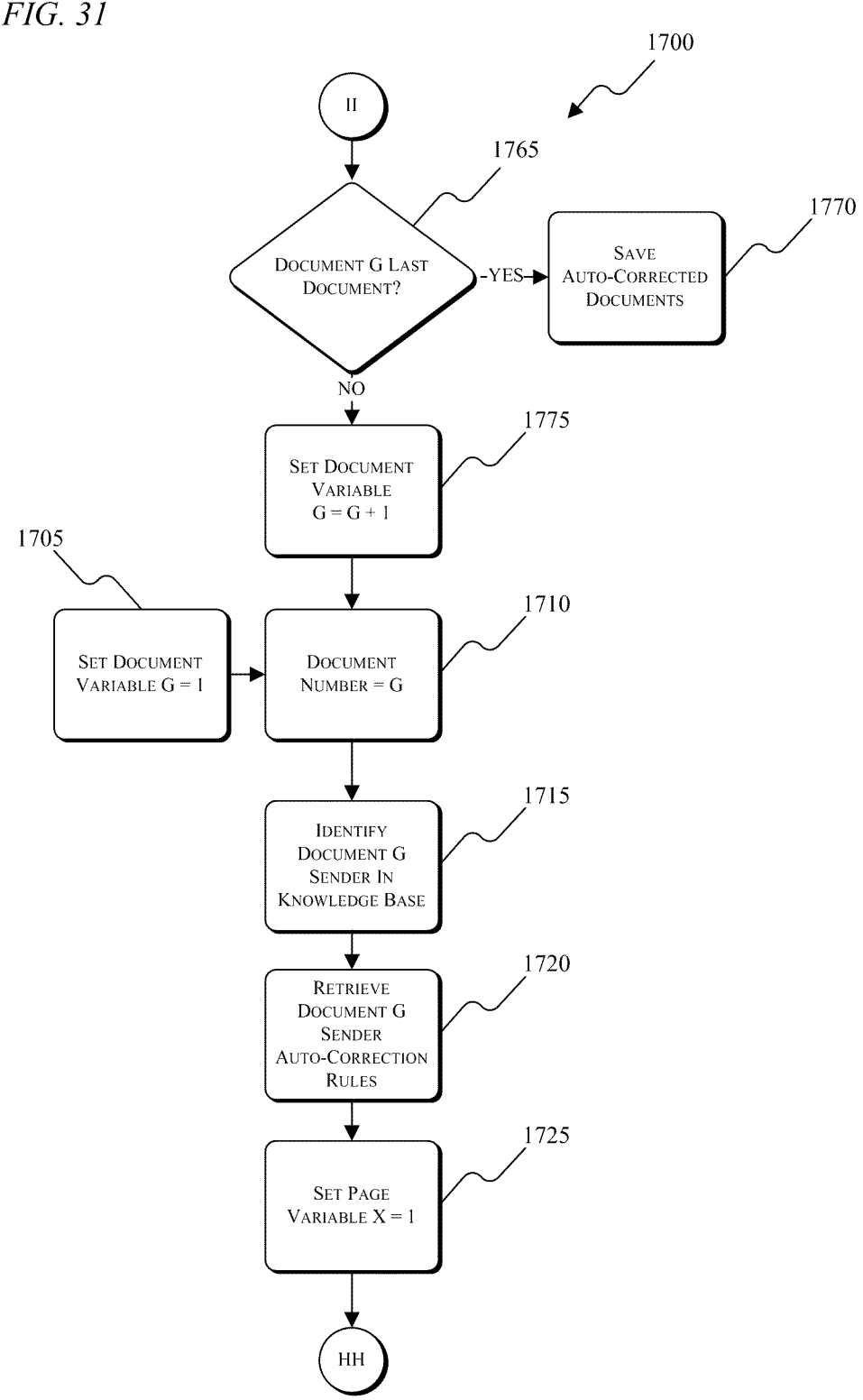
FIGS. 31-34 illustrate a process for performing the automatic document splitting.

With reference to FIG. 30, the extracted strings from each page are then reset (step 1640) (e.g., all extracted strings from each page are restored). Following step 1640, all of the strings that have the same value (e.g., are identical) and are positioned at the same location within each page are removed (step 1645). Following step 1645, all of the strings that are positioned at the same location in each page but always have different values are removed (step 1650). After step 1650, all of the strings which have no equivalent at the same location in any of the other pages are removed (step 1655) (e.g., strings which are unique to a single page). The knowledge base 125 then identifies the remaining strings of PAGES Z and (Z−1) that, for example, have the same value and are positioned at the same location (e.g., identical strings within one document) (step 1660). Following step 1660, the knowledge base 125 identifies additional documents, if any, from the sender of PAGE (Z−1) which were previously analyzed and stored (e.g., in the document store or another memory accessible by the knowledge base 125) (step 1665). The strings identified in step 1660 are then compared to the strings identified for the other, different documents from the sender of PAGE (Z−1) (step 1670). At step 1675, the knowledge base 125 determines whether any of the identified strings are different between PAGES Z and (Z−1) and the previously analyzed pages from the sender of PAGE (Z−1). If any strings are determined to be different, the strings are stored by the knowledge base 125 as rupture criteria (step 1680) and the process 1300 proceeds to control section Z.

The rupture criteria represent strings which are unique to a particular document from a particular sender. For example, when a sender sends multiple documents in a single batch of documents (i.e., a single compilation document), the system distinguishes between the two documents using the rupture criteria. In some embodiments, the rupture criteria represent the strings within each page of a first document from a first sender that are found only in the first document from the first sender. The pages of the first document are identified as an individual document (e.g., not a part of a previous or subsequent document) by comparing the rupture criteria to the strings within the pages. Because the rupture criteria are only found in a single document from the first sender, the system is able to separate the first document from, for example, a second document from the first sender. A similar analysis can also be performed on the second document, which has a set of rupture criteria corresponding to strings within the pages of the second document which are unique to only the second document from the first sender. At step 1675, if no strings were identified as being different, the process 1300 proceeds to control section Z in FIG. 25. In the event that there are no additional pages from the sender of PAGE (Z−1) that were previously analyzed, all of the strings identified at step 1660 are stored as rupture criteria. Then, as additional pages are analyzed, the rupture criteria are modified and updated.

As previously described, following the preliminary document separation based on sender data, automatic correction rules are retrieved from the knowledge base 125. With the knowledge base 125 being updated as described above with respect to process 1300, the greater the number of instances for which a particular document from a particular sender is analyzed by the document separation system, the more refined the automatic correction rules and the document separation become. Particularly, the greater the number of instances for which a particular document from a particular sender is analyzed, the more robust the rupture criteria, the first page criteria, the sender success counter, and the sender failure counter become.

A process 1700 for applying the automatic correction rules to a preliminarily separated compilation document is illustrated in FIGS. 31-34. Similar to the above-described processes, a single iteration of the process 1700 is described, and variables are used by the document separation system to keep track of which pages have been analyzed. At step 1705, a DOCUMENT VARIABLE G is set equal to one, and a DOCUMENT NUMBER is set equal to DOCUMENT VARIABLE G (step 1710). Following step 1710, the sender of DOCUMENT G is identified in the knowledge base 125 (step 1715). After the sender is identified, the automatic correction rules for that sender are retrieved (step 1720). A PAGE VARIABLE X is set equal to one (step 1725), and the process 1700 proceeds to control section HH shown in and described with respect to FIG. 32.

Figure 32:
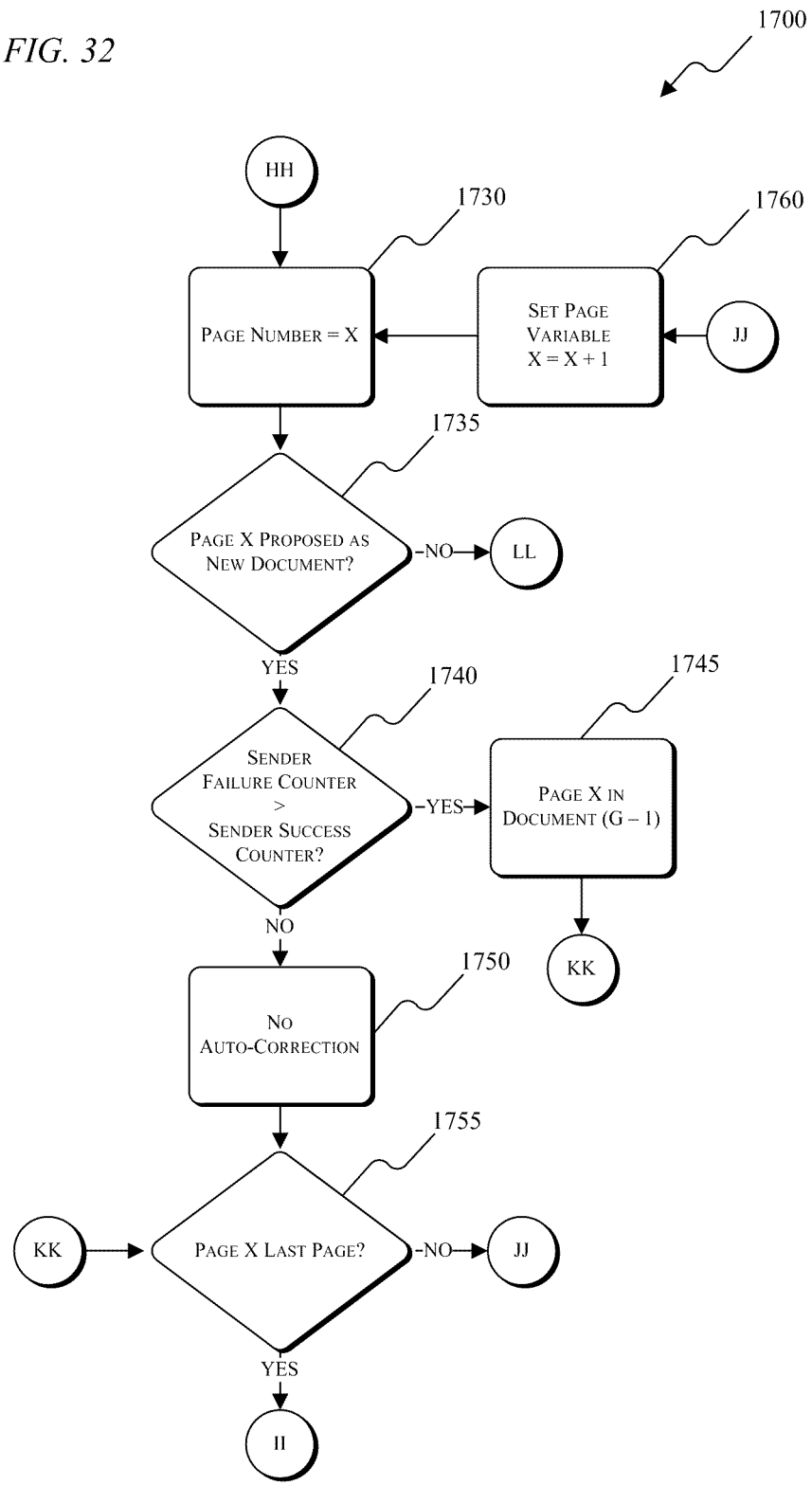

With reference to FIG. 32 and control section HH, a PAGE NUMBER is set equal to the PAGE VARIABLE X (step 1730), and the splitting module 115 determines whether PAGE X had been proposed as a new document (i.e., was PAGE X proposed as the first page of a document) (step 1735). If PAGE X was not proposed as a new document, the process 1700 proceeds to control section LL shown in and described with respect to FIG. 33. If PAGE X was proposed as a new document, the splitting module 115 determines whether the sender failure counter for the sender of PAGE X is greater than the sender success counter for the sender of PAGE X (step 1740). If the sender failure counter is greater than the sender success counter, PAGE X is added to DOCUMENT (G−1) (step 1745) and the process 1700 proceeds to control section KK. The sender failure counter being greater than the sender success counter indicates that identifying PAGE X as a new document was likely in error and the page is not a part of a new document. In some embodiments, the difference between the sender failure counter and the sender success counter must exceed a threshold value before an automatic correction is made.

If, at step 1740, the sender failure counter is not greater than the sender success counter, no automatic correction is performed (step 1750), and the splitting module 115 determines whether PAGE X is the last page of DOCUMENT G (step 1755). If PAGE X is not the last page, the process 1700 proceeds to control section JJ, the PAGE VARIABLE X is incremented (step 1760), and a new page of DOCUMENT G is analyzed. If PAGE X is the last page of DOCUMENT G, the process 1700 proceeds to control section II shown in and described with respect to FIG. 31, where the splitting module 115 determines whether DOCUMENT G is the last document from the preliminary document separation (step 1765). If DOCUMENT G is the last document, the automatically corrected documents are saved (step 1770). If DOCUMENT G is not the last document, the DOCUMENT VARIABLE G is incremented (step 1775) and automatic correction is performed on the next document.

Figure 33:
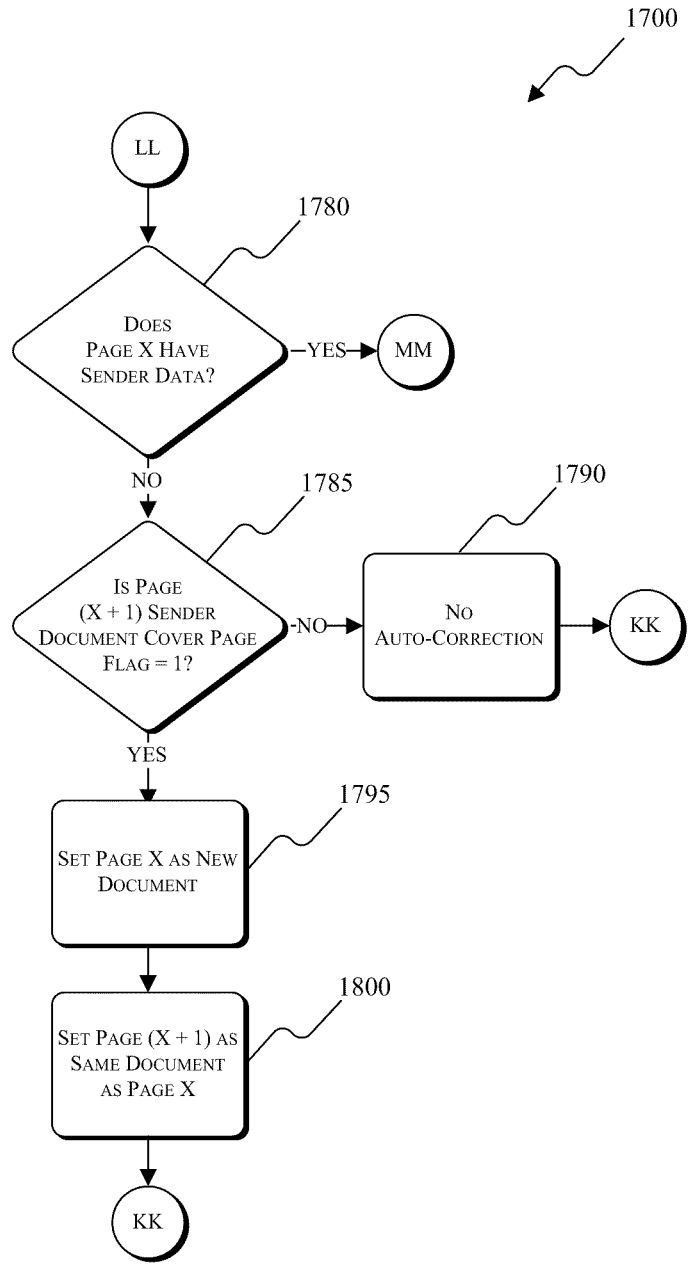

With reference to FIG. 33 and control section LL, the splitting module 115 determines whether PAGE X includes sender data (step 1780). If PAGE X includes sender data, the process 1700 proceeds to control section MM shown in and described with respect to FIG. 34. If PAGE X does not include sender data, the splitting module 115 determines whether the sender document cover page flag for PAGE (X+1) is equal to 1 (step 1785). If the sender document cover page flag is not equal to one, no automatic correction is performed (step 1790) and the process 1700 proceeds to control section KK. If the sender document cover page flag for PAGE (X+1) is equal to one, PAGE X is set as a new document (step 1795) and PAGE (X+1) is set as being in the same document as PAGE X (step 1800). The process 1700 then proceeds to control section KK of FIG. 32.

Figure 34:
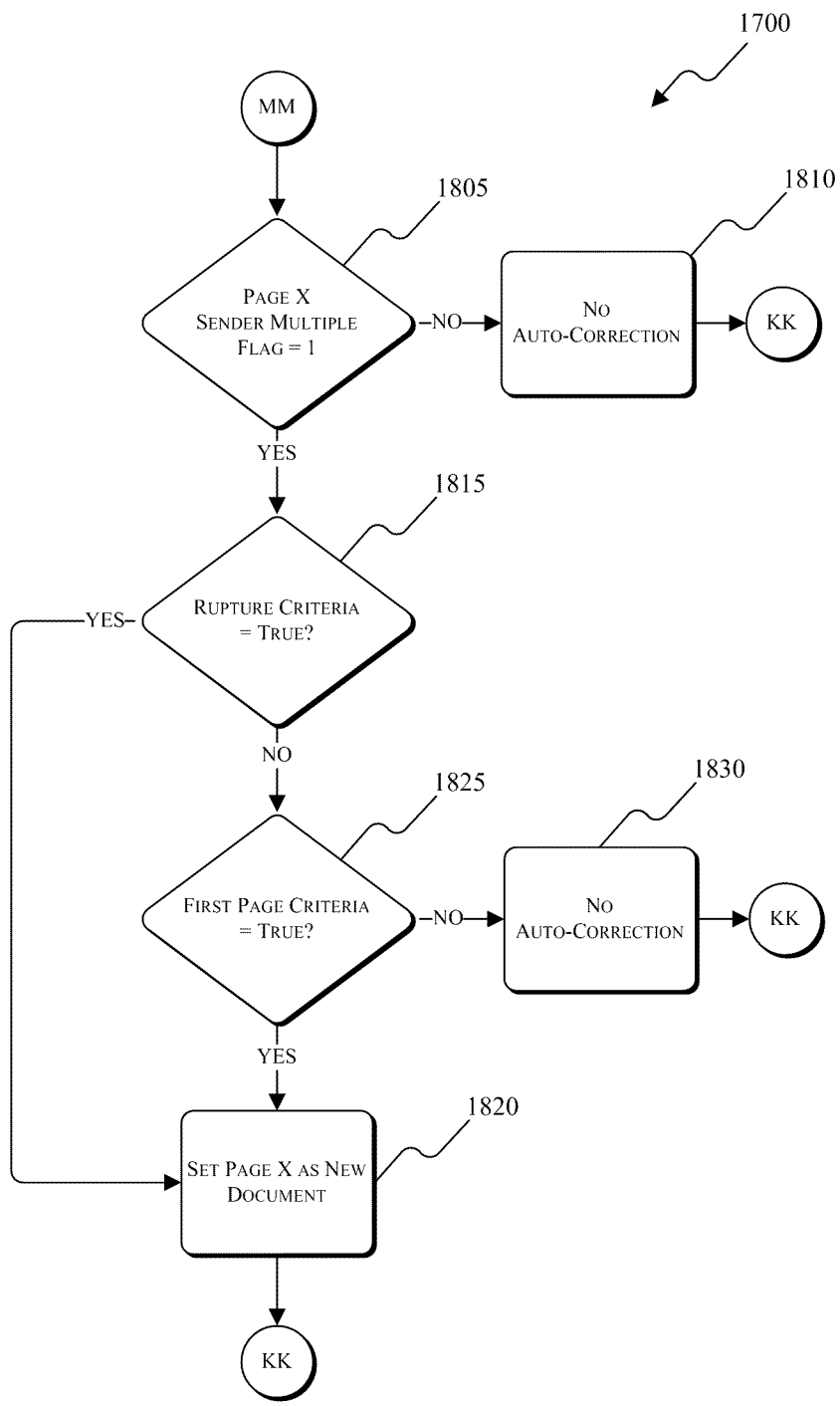

With reference to FIG. 34 and control section MM, the splitting module 115 determines whether the sender multiple flag for the sender of PAGE X is equal to one (step 1805). If the sender multiple flag is not equal to one, no automatic correction is performed (step 1810), and the process 1700 proceeds to control section KK. If, at step 1805, the sender multiple flag is equal to one, the splitting module 115 determines whether the rupture criteria are true (step 1815). In some embodiments, determining whether the rupture criteria are true includes extracting all of the strings from PAGE X and comparing the extracted strings to the strings which are stored as rupture criteria. In other embodiments, the locations of the strings which are stored as rupture criteria are analyzed by the splitting module 115 with respect to PAGE X without having to extract every string from PAGE X. The rupture criteria are determined to be true when strings within PAGE X match the rupture criteria. In some embodiments, the strings in PAGE X must exactly match the rupture criteria for the rupture criteria to be true. In other embodiments, the strings in PAGE X only need to sufficiently match the rupture criteria (e.g., a 95% match) for the rupture criteria to be true.

If, at step 1815, the rupture criteria are true, PAGE X is set as a new document (step 1820) and the process 1700 proceeds to control section KK. If, at step 1815, the rupture criteria are not true, the splitting module 115 determines whether the first page criteria are true (step 1825). The first page criteria are determined to be true or false in a manner similar to that described above with respect to the rupture criteria. If the first page criteria are not true, no automatic correction is performed (step 1830) and the process 1700 proceeds to control section KK. If the first page criteria are true, PAGE X is set as a new document (step 1820) and the process 1700 proceeds to control section KK in FIG. 32.

Returning to the previously-described six-page compilation document, automatic correction is applied to the preliminary document separation according to the process 1700 described above with respect to FIGS. 31-34. As a reminder, the compilation document is structured as follows: (1) page 1 is a first document and includes known sender data; (2) pages 2-3 are a second document, include the same sender data, and the sender is unknown; (3) pages 4-5 are a third document, page 4 is a cover sheet, and page 5 includes known sender data; and (4) page 6 is a fourth document and page 6 has the same sender information as page 5.

Applying the automatic correction process 1700 to such a compilation document results in the document separations shown below in Table #3. For descriptive purposes, the knowledge base 125 is assumed to include well defined rupture criteria, first page criteria, and sender success counters, and all of the sender success counters are greater than the sender failure counters.

TABLE #3

Automatic Correction

| Page # | Actual Document for Each Page | Preliminarily Separated Documents for Each Page Based on Sender Data | Automatically Separated Documents for Each Page Based on Knowledge Base |
| --- | --- | --- | --- |
| 1 | 1 | 1 | 1 |
| 2 | 2 | B | B |
| 3 | 2 | C | C |
| 4 | 3 | C | 3 |
| 5 | 3 | 5 | 3 |
| 6 | 4 | 5 | 4 |

As demonstrated by Table #3, the automatic correction rules applied using process 1700 corrects the previously incorrectly separated pages 4-6. For example, with respect to pages 4 and 5, the sender of pages 4 and 5 were known by the document separation system and page 4 was a cover sheet. The knowledge base 125 previously identified the presence of a cover page for documents from the known sender, and the sender document cover page flag was set for page 5. Process 1700 was therefore able to correctly reclassify pages 4 and 5 as a new document. With respect to page 6, which was sent by the same sender as pages 4 and 5, the sender multiple flag for the sender of page 6 was set in the automatic correction rules from the knowledge base 125. Page 6 was properly corrected to a new document when the rupture criteria associated with the additional document from this sender was matched to extracted data strings from page 6.

As is also demonstrated by Table #3, the automatic correction rules failed to correct pages 2 and 3, which are in the same document. Because the knowledge base 125 learns over time, the automatic correction is dependent upon the document separation system having previously analyzed and processed documents from a particular sender to make corrections. As indicated above, while pages 2 and 3 included sender data, the sender was unknown and the pages were correctly preliminarily separated into DOCUMENT B and DOCUMENT C. Following the first instance of a document from this sender and a manual correction by the user, the document separation system is able to correctly identify pages 2 and 3 as being in the same document.

Thus, the invention provides, among other things, automated document separation systems and methods which adapt and learn from prior user corrections to increase the efficiency of the document separation. Various features and advantages of the invention are set forth in the following claims.

What is claimed is:

1. A method of automatically splitting electronic documents, the method comprising:
   extracting one or more data strings from a compilation document that includes at least two pages;
   identifying sender information for a first page of the at least two pages based on the extracted data strings;
   identifying sender information for a second page of the at least two pages based on the extracted data strings;
   comparing the sender information for the first page to the sender information for the second page;
   separating, when the sender information for the first page is different than the sender information from the second page, the first page into a first separated document and the second page into a second separated document based on the sender information for the first page and the sender information for the second page;
   accessing a first automatic correction rule in a knowledge base for the first separated document;
   accessing a second automatic correction rule in the knowledge base for the second separated document;
   performing a first automatic correction on the first separated document based on the first automatic correction rule to generate a first automatically-corrected document;
   performing a second automatic correction on the second separated document based on the second automatic correction rule to generate a second automatically-corrected document;
   receiving user feedback related to the first or second automatically-corrected documents;
   analyzing the received user feedback; and
   updating the first automatic correction rule or the second automatic correction rule based on the analysis of the user feedback.

2. The method of claim 1, further comprising receiving the compilation document over a network.

3. The method of claim 1, wherein the received user feedback includes an indication of whether each of the at least two pages of the compilation document were correctly separated.

4. The method of claim 1, further comprising comparing a first set of extracted data strings from the first page of the at least two pages of the compilation document to a second set of extracted data strings from the second page of the at least two pages of the compilation document.

5. The method of claim 4, further comprising identifying data strings in the first set of extracted data strings that are positioned in the same location and that are substantially similar to data strings in the second set of extracted data strings.

6. The method of claim 5, further comprising
   identifying data strings in the first set of extracted data strings that are unique to the first set of extracted data strings; and
   identifying data strings in the second set of extracted data strings that are unique to the second set of extracted data strings.

7. The method of claim 6, further comprising identifying a set of first page criteria based at least in part on the identified data strings.

8. The method of claim 6, further comprising identifying a set of rupture criteria based at least in part on the identified data strings.

9. A system for automated document separation, the system comprising:
a client device configured to
transmit a compilation document including at least two pages over a network; and
a host device including a processor and configured to
extract one or more data strings from the compilation document;
identify sender information for a first page of the at least two pages of the compilation document based on the extracted data strings;
identify sender information for a second page of the at least two pages of the compilation document based on the extracted data strings;
compare the sender information for the first page to the sender information for the second page;
separate, when the sender information for the first page is different than the sender information from the second page, the first page of the compilation document into a first separated document and the second page into a second separated document based on the sender information for the first page and the sender information for the second page;
access a first automatic correction rule in a knowledge base for the first separated document;
access a second automatic correction rule in the knowledge base for the first separated document;
perform a first automatic correction on the first separated document based on the first automatic correction rule to generate a first automatically-corrected document;
perform a second automatic correction on the second separated document based on the second automatic correction rule to generate a second automatically-corrected document;
receive user feedback related to the first or second automatically-corrected documents;
analyze the received user feedback; and
update the first automatic correction rule or the second automatic correction rule based on the analysis of the user feedback.

10. The system of claim 9, wherein the received user feedback includes an indication of whether each of the at least two pages of the compilation document was correctly separated.

11. The system of claim 9, wherein the processor is further configured to compare a first set of extracted data strings from the first page of the at least two pages in the compilation document to a second set of extracted data strings from the second page of the at least two pages in the compilation document.

12. The system of claim 11, wherein the processor is further configured to identify data strings in the first set of extracted data strings that are positioned in the same location and that are substantially similar to data strings in the second set of extracted data strings.

13. The system of claim 12, wherein the processor is further configured to
identify data strings in the first set of extracted data strings that are unique to the first set of extracted data strings; and
identify data strings in the second set of extracted data strings that are unique to the second set of extracted data strings.

14. The system of claim 13, wherein the processor is further configured to identify a set of first page criteria based at least in part on the identified data strings.

15. The system of claim 13, wherein the processor is further configured to identify a set of rupture criteria based at least in part on the identified data strings.

16. A device for automated document separation, the device comprising:
a memory; and
a processor connected to the memory and configured to
extract one or more data strings from a compilation document that includes at least two pages;
identify sender information for a first page of the at least two pages of the compilation document based on the extracted data strings;
identify sender information for a second page of the at least two pages of the compilation document based on the extracted data strings;
compare the sender information for the first page to the sender information for the second page;
separate, when the sender information for the first page is different than the sender information from the second page, the first page of the compilation document into a first separated document and the second page into a second separated document based on the sender information;
access a first automatic correction rule in a knowledge base for the first separated document;
access a second automatic correction rule in the knowledge base for the second separated document;
perform a first automatic correction on the first separated document based on the first automatic correction rule to generate a first automatically-corrected document;
perform a first automatic correction on the first separated document based on the first automatic correction rule to generate a first automatically-corrected document;
receive user feedback related to the first or second automatically-corrected documents;
analyze the received user feedback; and
update the first automatic correction rule or the second automatic correction rule based on the analysis of the user feedback.

17. The device of claim 16, wherein the received user feedback includes an indication of whether each of the at least two pages of the compilation document was correctly separated.

18. The device of claim 16, wherein the processor is further configured to compare a first set of extracted data strings from the first page of the at least two pages in the compilation document to a second set of extracted data strings from the second page of the at least two pages in the compilation document.

19. The device of claim 18, wherein the processor is further configured to
identify data strings in the first set of extracted data strings that are positioned in the same location and that are substantially similar to data strings in the second set of extracted data strings;
identify data strings in the first set of extracted data strings that are unique to the first set of extracted data strings; and
identify data strings in the second set of extracted data strings that are unique to the second set of extracted data strings.

20. The device of claim 19, wherein the processor is further configured to identify a set of first page criteria based at least in part on the identified data strings; and identify a set of rupture criteria based at least in part on the identified data strings.

* * * * *